United States Patent
Sauder et al.

(10) Patent No.: US 8,738,243 B2
(45) Date of Patent: *May 27, 2014

(54) PLANTER MONITOR SYSTEM AND METHOD

(71) Applicant: Precision Planting LLC, Tremont, IL (US)

(72) Inventors: Gregg A. Sauder, Tremont, IL (US); Justin L. Koch, Deer Creek, IL (US)

(73) Assignee: Precision Planting LLC, Tremont, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/752,031

(22) Filed: Jan. 28, 2013

(65) Prior Publication Data

US 2013/0138289 A1 May 30, 2013

Related U.S. Application Data

(60) Division of application No. 13/282,384, filed on Nov. 9, 2011, now Pat. No. 8,386,137, which is a continuation of application No. 12/522,252, filed as application No. PCT/US2008/050445 on Jan. 7, 2008, now Pat. No. 8,078,367.

(60) Provisional application No. 60/883,965, filed on Jan. 8, 2007.

(51) Int. Cl.
| | |
|---|---|
| A01C 15/00 | (2006.01) |
| G06F 7/70 | (2006.01) |
| G06F 19/00 | (2011.01) |
| G06G 7/00 | (2006.01) |
| G06G 7/76 | (2006.01) |

(52) U.S. Cl.
USPC .............. 701/50; 111/200; 111/903; 705/500; 715/719; 715/965

(58) Field of Classification Search
USPC .......... 111/104, 903, 200; 701/50, 1; 705/1.1, 705/400, 500; 715/700, 716, 719, 961, 962, 715/965, 966
See application file for complete search history.

(56) References Cited

U.S. PATENT DOCUMENTS

| | | | | |
|---|---|---|---|---|
| 6,070,539 | A * | 6/2000 | Flamme et al. | 111/177 |
| 6,701,857 | B1 * | 3/2004 | Jensen et al. | 111/200 |
| 8,078,367 | B2 * | 12/2011 | Sauder et al. | 701/50 |
| 8,386,137 | B2 * | 2/2013 | Sauder et al. | 701/50 |

* cited by examiner

*Primary Examiner* — Christopher J Novosad
(74) *Attorney, Agent, or Firm* — Thomas J. Oppold; Larkin Hoffman Daly & Lindgren Ltd.

(57) ABSTRACT

A planter monitor system and method that provides an operator with near real-time data concerning yield robbing events and the economic cost associated with such yield robbing events so as to motivate the operator to take prompt corrective action.

28 Claims, 13 Drawing Sheets

Row 16 Details

| Population | Skips 0.2% |
|---|---|
| 29.6 Singulation 99.2% | Mult's 0.6% |
| Down Force 229 lbs Vacuum 17.2 in | $Loss/acre $13.10 |
| Good Spacing 98.4% | ▲ ▲ ▲ ■ ▼ ▼ |

Home | Row Details | ← | → | ↓ Back

PLANTER MONITOR SYSTEM AND METHOD

CROSS-REFERENCE TO RELATED APPLICATIONS

This application is a divisional of application Ser. No. 13/292,384 filed Nov. 9, 2011 which is a continuation of application Ser. No. 12/522,252 filed Jul. 6, 2009 which claims priority to international application no. PCT/US2008/050445 filed Jan. 7, 2008, which claims priority to provisional application no. 60/883,965 filed Jan. 8, 2007.

BACKGROUND

Annually in the United States, over 70 million corn acres are planted by approximately 40,000 growers, resulting in over 12 billion bushels of corn harvested annually, which, in-turn, translates into annual revenues in excess of $20 billion. Many growers recognize that one of the most influential and controllable factors affecting the productivity of each acre planted is the quality of seed placement. If a grower can be provided with more information earlier about seed placement quality while planting, the grower will be able to make earlier corrections or adjustments to the planter or its operation which could increase production by three to nine bushels per acre, which at today's prices translates into an additional $9.00 to $27.00 of additional income per acre at no cost. The net gain to growers and the US economy from such production increases would amount to hundreds of millions of dollars annually.

Although existing monitors may warn the planter operator about certain "yield-robbing events," many operators simply ignore the warnings or delay making any corrections or adjustments until it is convenient for the operator to do so (such as at the end of the field or when refilling the hoppers, etc.). The lack of motivation to take immediate corrective action may be due to the operator not knowing or not fully appreciating the extent of economic loss caused by the yield robbing event. Another possibility may be that because most existing planter monitors provide only broad averages across the entire planter in terms of seeds per acre or singulation percentage, the operator may not know that a particular row is suffering from a yield robbing event if the overall average population or singulation appears to be inline with the target or desired values.

"Yield-robbing events" are generally caused by one of two types of errors, namely, metering errors and placement errors. Metering errors occur when, instead of seeds being discharged one at a time, either multiple seeds are discharged from the meter simultaneously (typically referred to as "multiplies" or "doubles"), or when no seed is discharged from the meter when one should have been (typically referred to as a "skip"). It should be appreciated that seed multiples and seed skips will result in a net loss in yield when compared to seeds planted with proper spacing because closely spaced plants will produce smaller ears due to competition for water and nutrients. Similarly, seed skips will result in a net loss in yield even though adjacent plants will typically produce larger ears as a result of less competition for water and nutrients due to the missing plant.

Placement errors occur when the travel time between sequentially released seeds is irregular or inconsistent as compared to the time interval when the seeds were discharged from the seed meter, thereby resulting in irregular spacing between adjacent seeds in the furrow. Placement errors typically result from seed ricochet within the seed tube caused by the seed not entering the seed tube at the proper location, or by irregularities or obstructions along the path of the seed within the seed tube, or due to excessive vertical accelerations of the row unit as the planter traverses the field.

Beyond metering errors and placement errors, another yield robbing event is attributable to inappropriate soil compaction adjacent to the seed, either due to inadequate down pressure exerted by the gauge wheels on the surrounding soil or excessive down pressure exerted by the gauge wheels. As discussed more thoroughly in commonly owned, co-pending PCT Application No. PCT/US2008/50427, which is incorporated herein in its entirety by reference, if too little downforce is exerted by the gauge wheels or other depth regulating member, the disk blades may not penetrate into the soil to the full desired depth and/or the soil may collapse into the furrow as the seeds are being deposited resulting in irregular seed depth. However, if excessive down force is applied, poor root penetration may result in weaker stands and which may place the crops under unnecessary stress during dry conditions. Excessive downforce may also result in the re-opening of the furrow affecting germination or causing seedling death.

While some experienced operators may be able to identify certain types of corrective actions needed to minimize or reduce particular types of yield robbing events once properly advised of their occurrence and their economic impact, other operators may not be able to so readily identify the type of corrective actions required, particularly those with less planting experience generally, or when the operator has switched to a new make or model planter.

Accordingly, there is a need for a monitor system and method that is capable of providing the operator with near real-time data concerning yield robbing events and the economic cost associated with such yield robbing events so as to motivate the operator to take prompt corrective action.

DESCRIPTION OF THE DRAWINGS

FIG. 9 is an example of the preferred embodiment of a Level 3 Row Detail screen display for the monitor system of FIG. 5 showing a preferred format for reporting specific row performance details.

DETAILED DESCRIPTION

Figure 1:
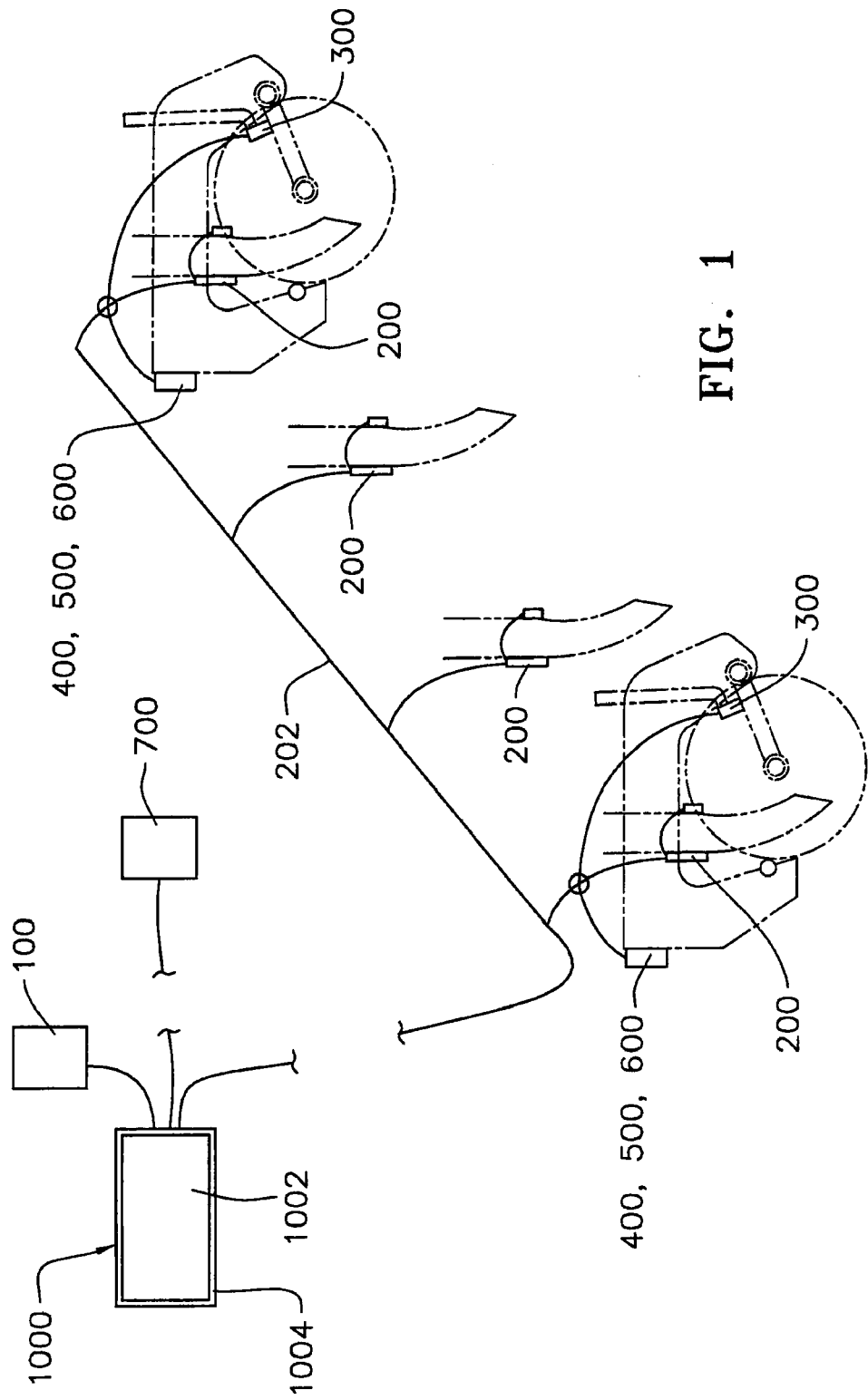
FIG. 1 is a schematic illustration of a preferred embodiment of a planter monitor system of the present invention for monitoring the operation and performance of a planter.

Referring now to the drawings, wherein like reference numerals designate identical or corresponding parts throughout the several views, FIG. 1 is a schematic illustration of a preferred embodiment of a planter monitor system 1000 of the present invention for monitoring the operation and performance of a planter 10. As is conventional, the preferred planter monitor system 1000 includes a visual display 1002 and user interface 1004, preferably a touch screen graphic user interface (GUI). The preferred touch screen GUI 1004 is preferably supported within a housing 1006 which also houses a microprocessor, memory and other applicable hardware and software for receiving, storing, processing, communicating, displaying and performing the various preferred features and functions as hereinafter described (hereinafter, collectively, the "processing circuitry") as readily understood by those skilled in the art.

As illustrated in FIG. 1, the preferred planter monitor system 1000 preferably cooperates and/or interfaces with various external devices and sensors as hereinafter described, including, for example, a GPS unit 100, a plurality of seed sensors 200, one or more load sensors 300, one or more inclinometers 400, vertical accelerometers 500, horizontal accelerometers 600, vacuum sensors 700 (for planters with pneumatic metering systems), or any other sensor for monitoring the planter or the environment that may affect planting operations.

Figure 2:
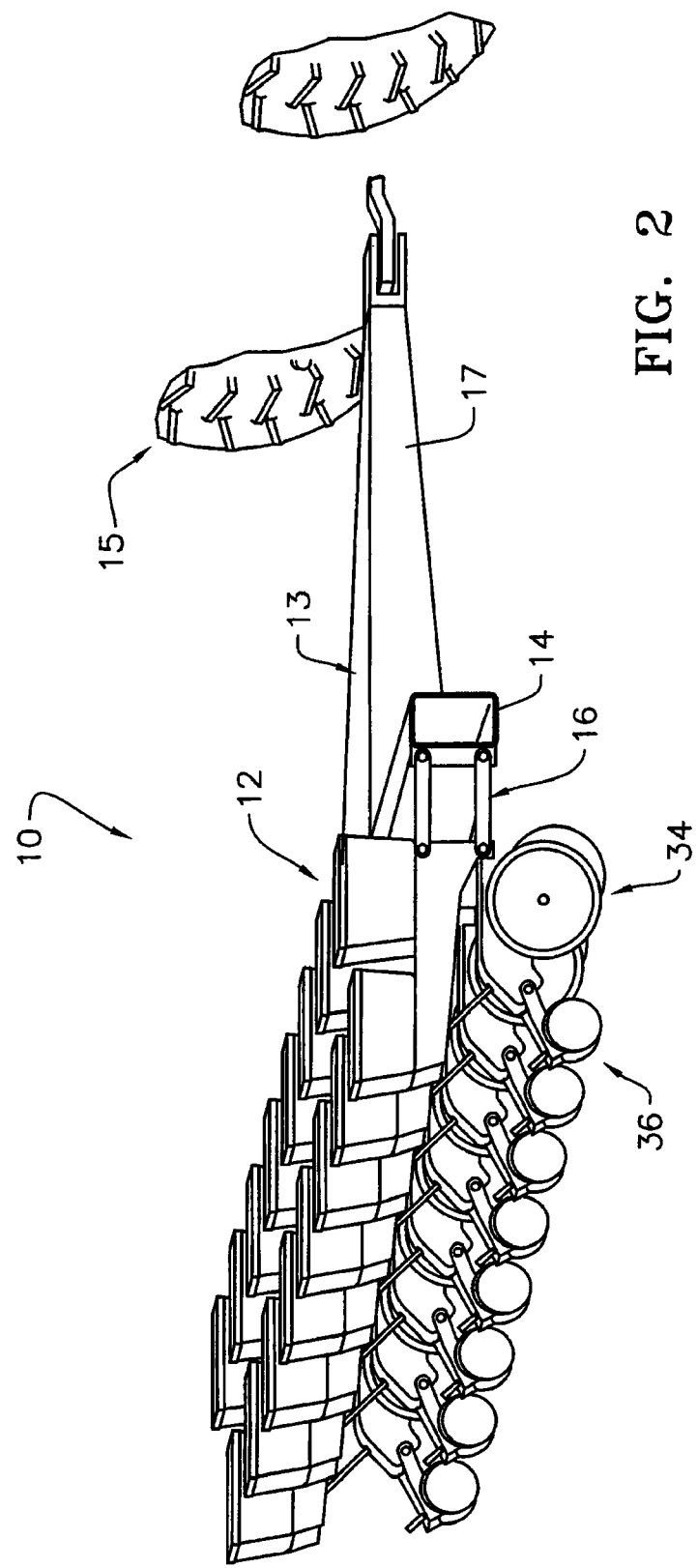
FIG. 2 is a perspective view of convention row crop planter.

FIG. 2 illustrates a conventional row-crop planter 10 such as a John Deere MaxEmerge or MaxEmerge Plus planter in connection with which the planter monitor system and method of the present invention may be used. It should be appreciated that although reference is made throughout this specification to row-crop planters and, in particular, certain models of John Deere planters, such references are simply examples to provide context and a frame of reference for the subject matter discussed. As such, the present planter monitor system and method should not be construed as being limited for use with any particular make or model of planter. Likewise, the present planter monitor system should not be construed as being limited to row-crop planters, since the features and functionalities of the monitor system may have application to grain drills or other planter types as well.

The planter 10 includes a plurality of spaced row-units 12 supported along a toolbar 14 of the planter main frame 13. The planter main frame 13 attaches to a tractor 15 in a conventional manner, such as by a drawbar 17 or three-point hitch arrangement as is well known in the art. Ground wheel assemblies (not shown) support the main frame 13 above the ground surface and are moveable relative to the main frame 13 through actuation of the planter's hydraulic system (not shown) coupled to the tractor's hydraulics to raise and lower the planter main frame 13 between a transport position and a planting position, respectively.

Figure 3:
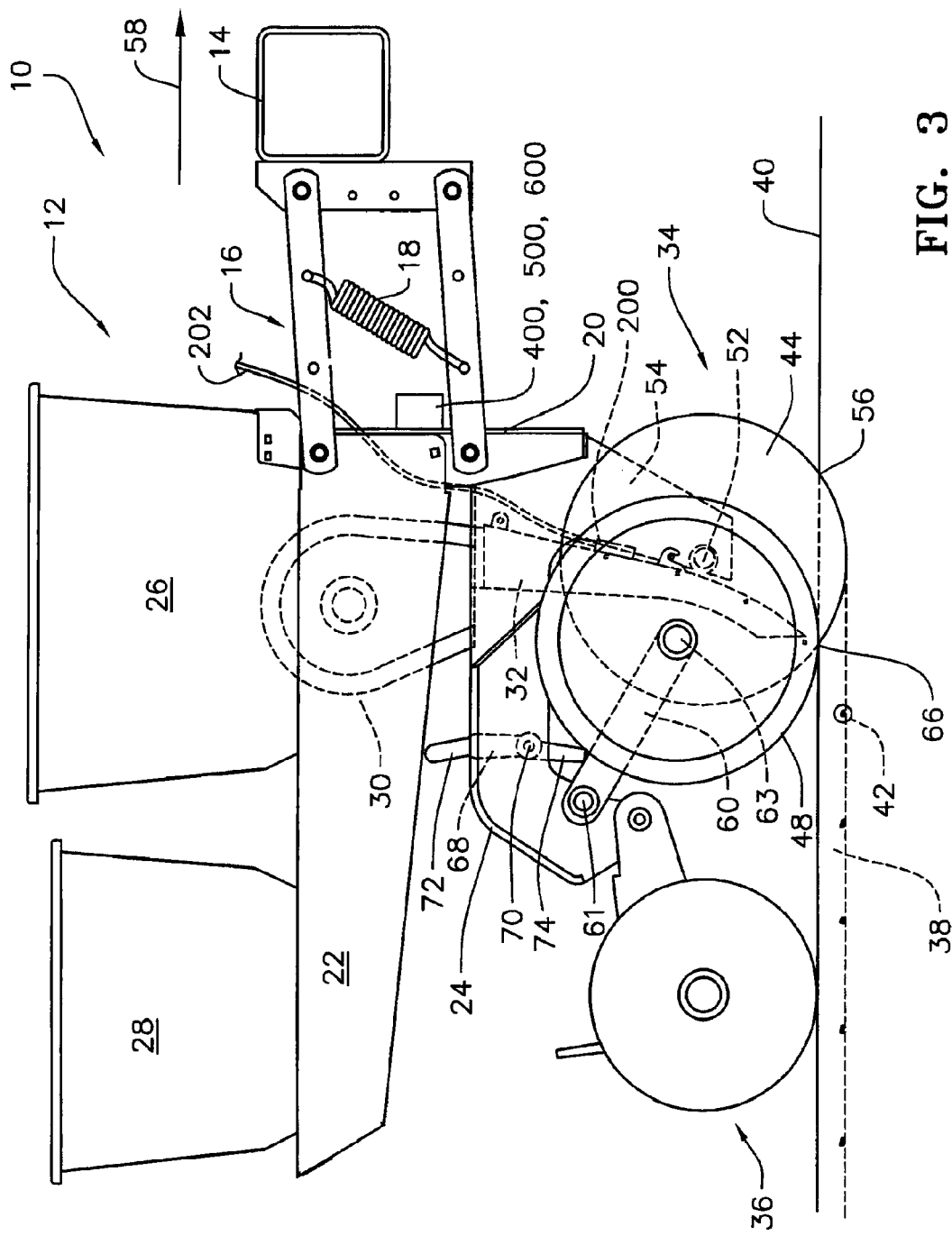
FIG. 3 is a side elevation view of a row unit of the conventional row crop planter of FIG. 2.

As best illustrated in FIG. 3, each row unit 12 is supported from the toolbar by a parallel linkage 16 which permits each row unit 12 to move vertically independently of the toolbar 14 and the other spaced row units in order to accommodate changes in terrain or upon the row unit encountering a rock or other obstruction as the planter is drawn through the field. Biasing means 18, such as springs, air bags, hydraulic or pneumatic cylinders or the like, act on the parallel linkage 16 to exert a downforce on the row unit for purposes discussed in detail later. Each row unit 12 further includes a front mounting bracket 20 to which is mounted a hopper support beam 22 and a subframe 24. The hopper support beam 22 supports a seed hopper 26 and a fertilizer hopper 28 as well as operably supporting a seed meter 30 and seed tube 32. The subframe 24 operably supports a furrow opening assembly 34 and a furrow closing assembly 36.

In operation, the furrow opening assembly cuts a furrow 38 (FIGS. 3 and 4) into the soil surface 40 as the planter is drawn through the field. The seed hopper 26, which holds the seeds to be planted, communicates a constant supply of seeds 42 to the seed meter 30. The seed meter 30 of each row unit 12 is typically coupled to the ground wheels through use of shafts, chains, sprockets, transfer cases, etc., as is well known in the art, such that individual seeds 42 are metered and discharged into the seed tube 32 at regularly spaced intervals based on the seed population desired and the speed at which the planter is drawn through the field. The seed 42 drops from the end of the seed tube 32 into the furrow 38 and the seeds 42 are covered with soil by the closing wheel assembly 36.

The furrow opening assembly 34 typically includes a pair of flat furrow opening disk blades 44, 46 and a depth regulation assembly 47. In the embodiment of FIGS. 2 and 3, the depth regulation assembly 47 comprises a pair of gauge wheels 48, 50 selectively vertically adjustable relative to the disk blades 44, 46 by a height adjusting mechanism 49. It should be appreciated, however, that instead of dual opening disks and dual gauge wheels as shown in the embodiment of FIGS. 2 and 3, the planter 10 may utilize any other suitable furrow opener and depth regulation assembly suitable for cutting a furrow in the soil and regulating or controlling the depth of that furrow.

In the planter embodiment of FIGS. 2 and 3, the disk blades 44, 46 are rotatably supported on a shaft 52 mounted to a shank 54 depending from the subframe 24. The disk blades 44, 46 are canted such that the outer peripheries of the disks come in close contact at the point of entry 56 into the soil and diverge outwardly and upwardly away from the direction of travel of the planter as indicated by the arrow 58. Thus, as the planter 10 is drawn through the field, the furrow opening disks 44, 46 cut a V-shaped furrow 38 through the soil surface 40 as previously described.

Figure 4:
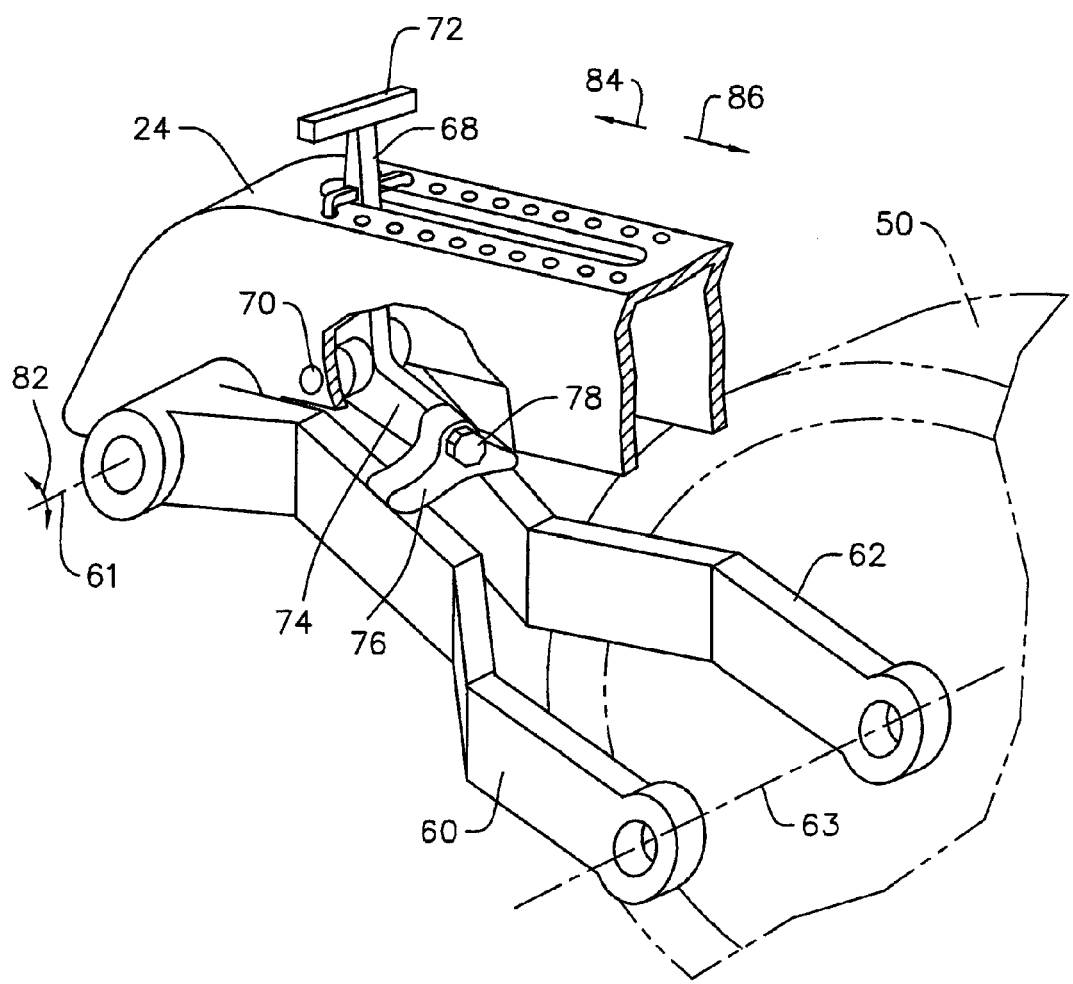
FIG. 4 is a perspective view of the gauge wheel height adjustment mechanism of the conventional row crop planter of FIG. 2.
Figure 5:
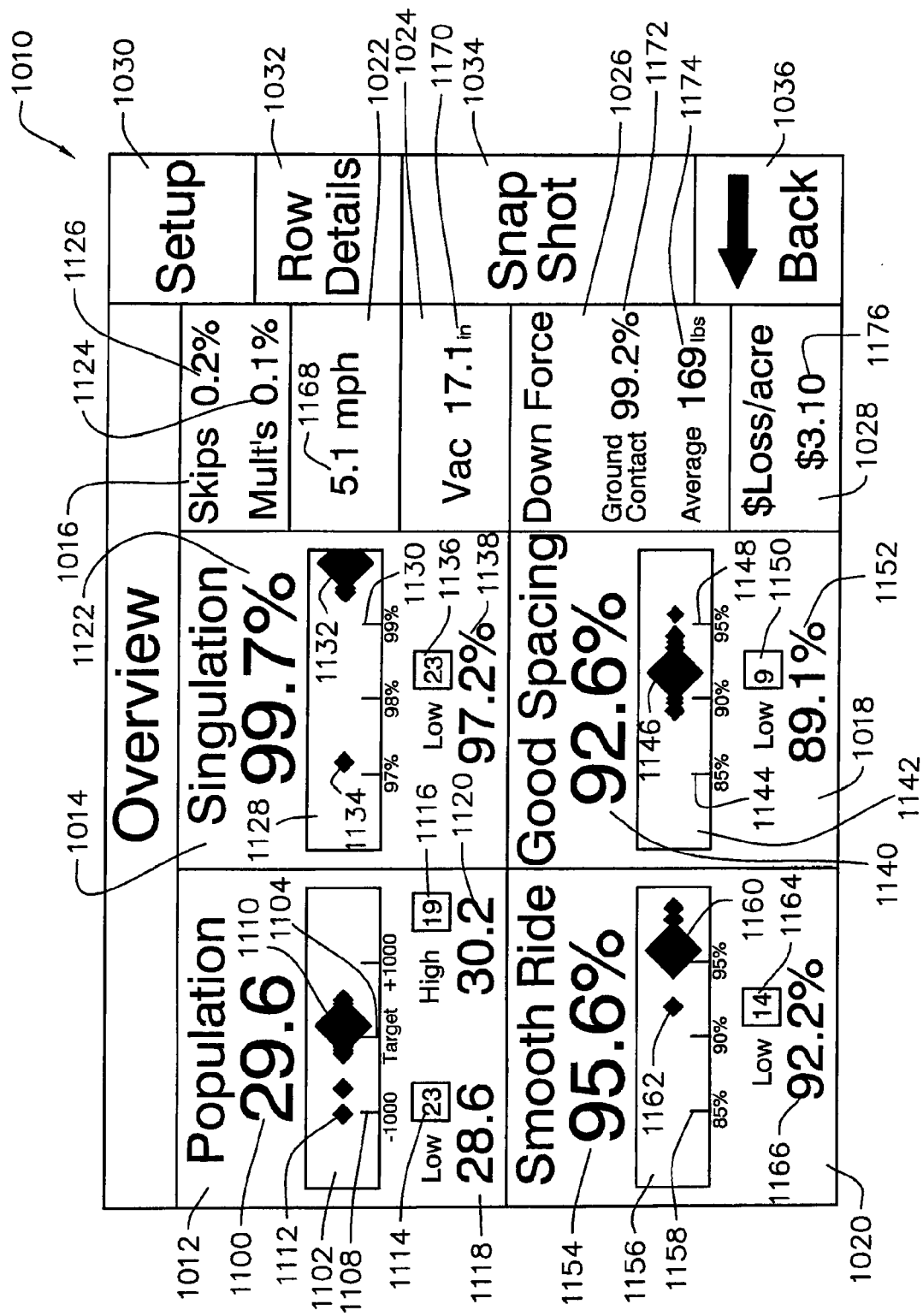
FIG. 5 is an example of the preferred Level 1 Screen display for a monitor system in accordance with the present invention showing a preferred format for reporting overall planter performance details.

As best illustrated in FIGS. 3 and 5, gauge wheel arms 60, 62 pivotally support the gauge wheels 48, 50 from the subframe 24 about a first axis 61. The gauge wheels 48, 50 are rotatably mounted to the forwardly extending gauge wheel arms 60, 62 at a second axis 63. The gauge wheels 48, 50 are slightly larger in diameter than the disk blades 44, 46 such that the outer peripheries of the disk blades rotate at a slightly greater velocity than the gauge wheel peripheries. Each of the gauge wheels 48, 50 includes a flexible lip 64 (FIG. 4) at its interior face which contacts the outer face of the respective disk blade 44, 46 at the area 66 (FIG. 3) where the disk blades exit the soil. It should be appreciated that as the opening disks 44, 46 exit the soil after slicing the V-shaped furrow 38, the soil, particularly in wet conditions, will tend to adhere to the disk, which, if not prevented, would cause the furrow walls to be torn away as the disk rotates out of the soil causing poor furrow formation and/or collapse of the furrow walls, resulting in irregular seed planting depth. Thus, as best illustrated in FIGS. 3 and 4, to prevent the furrow walls from tearing away as the disk blades exit the soil, the gauge wheels 48, 50 are positioned to compact the strip of soil adjacent to the furrow while at the same time serving to scrape against the outer face of the disks 44, 46 to shear off any soil buildup as the disks exit the soil. Accordingly, the opening disks 44, 46 and the gauge wheels 48, 50 cooperate to firm and form uniform furrow walls at the desired depth.

In the planter embodiment of FIGS. 2 and 3, the depth adjustment mechanism 67 which is used to vary the depth of the seed furrow 38 is accomplished through the vertical adjustment of the gauge wheels 48, 50 relative to the furrow opening disk blades 44, 46 by selective positioning of a height adjustment arm 68. In this embodiment, a height adjusting arm 68 is pivotally supported from the subframe 24 by a pin 70 (FIGS. 3 and 5). An upper end 72 of the height adjusting arm 68 is selectively positionable along the subframe 24. As best illustrated in FIG. 5, a rocker 76 is loosely pinned to the lower end 74 of the height adjusting arm 68 by a pin or bolt 78. The rocker 76 bears against the upper surfaces of the pivotable gauge wheel arms 60, 62, thereby serving as a stop to prevent the gauge wheel arms 60, 62 from pivoting counter-clockwise about the first pivot axis 61 as indicated by arrow 82. Thus, it should be appreciated that as the upper end 72 of the height adjusting arm 68 is selectively positioned, the position of the rocker/stop 76 will move accordingly relative to the gauge wheel arms 60, 62. For example, referring to FIG. 5, as the upper end 72 of the height adjusting arm 68 is moved in the direction indicated by arrow 84, the position of the rocker/stop 76 will move upwardly away from the gauge wheel arms 60, 62, allowing the gauge wheels 48, 50 to move vertically upwardly relative to the furrow opening disk blades 44, 46 such that more of the disk blade will extend below the bottom of the gauge wheels 48, 50, thereby permitting the furrow opening disk blades 44, 46 to penetrate further into the soil. Likewise, if the upper end 72 of the height adjusting arm 68 is moved in the direction indicated by arrow 86, the rocker/stop 76 will move downwardly toward the gauge wheel arms 60, 62, causing the gauge wheels 48, 50 to move vertically downwardly relative to the furrow opening disk blades 44, 46, thereby shortening the penetration depth of the disk blades into the soil. When planting row crops such as corn and soybeans, the position of the rocker/stop 76 is usually set such that the furrow opening disk blades 44, 46 extend below the bottom of the gauge wheels 48, 50 to create a furrow depth between one to three inches.

In addition to serving as a stop as previously described, the loosely pinned rocker 76 serves the dual function of "equalizing" or distributing the load carried by the two gauge wheels 48, 50, thereby resulting in more uniform furrow depth. It should be appreciated that during planting operations, substantially the entire live and dead load of the row unit 12 along with the supplemental downforce exerted by the biasing means 18 will be carried by the gauge wheels 48, 50 after the opening disks 44, 46 penetrate the soil to the depth where the gauge wheel arms 60, 62 encounter the pre-selected stop position of the rocker 76. This load is transferred by the pin 78 through the rocker 76 to the gauge wheel arms 60, 62. Because the rocker 76 is loosely pinned to the height adjusting arm 68, the row unit load is distributed substantially equally between the two gauge wheel arms 60, 62 such that one-half of the load is carried by each arm 60, 62. Thus, for example, if gauge wheel 48 encounters an obstruction such as a rock or hard soil clod, the gauge wheel arm 60 will be forced upwardly as the gauge wheel 48 rides up and over the obstruction. Since the rocker 76 is connected to the height adjusting arm 68 by the pin 78, the rocker 76 will pivot about pin 78 causing an equal but opposite downward force on the other arm 62. As such, the rocker 76 equalizes or distributes the load between the two gauge wheels. If there was no rocker such that lower end 74 of the height adjusting arm 68 was simply a bearing surface, upon one of the gauge wheels encountering an obstruction or uneven terrain, the entire load of the row unit 12 would be carried by that single gauge wheel as it rides up and over the obstruction or until the terrain was again level. Again, as previously stated, the specific reference to the foregoing components describing the type of furrow opening assembly, depth regulation member, seed meter, etc., may vary depending on the type of planter.

There are various types of commercially available seed meters 30 which can generally be divided into two categories on the basis of the seed selection mechanism employed, namely, mechanical or pneumatic. The most common commercially available mechanical meters include finger-pickup meters such as disclosed in U.S. Pat. No. 3,552,601 to Hansen ("Hansen '601"), cavity-disc meters such as disclosed in U.S. Pat. No. 5,720,233 to Lodico et al. ("Lodico '233"), and belt meters such as disclosed in U.S. Pat. No. 5,992,338 to Romans ("Romans '338"), each of which is incorporated herein in its entirety by reference. The most common commercially available pneumatic meters include vacuum-disc meters such as disclosed in U.S. Pat. No. 3,990,606 to Gugenhan ("Gugenhan '606") and in U.S. Pat. No. 5,170,909 to Lundie et al. ("Lundie '909") and positive-air meters such as disclosed in U.S. Pat. No. 4,450,979 to Deckler ("Deckler '979"), each of which is also incorporated herein in its entirety by reference. The planter monitor system and method of the present invention should not be construed as being limited for use in connection with any particular type of seed meter.

The GPS unit 100, such as a Deluo PMB-288 available from Deluo, LLC, 10084 NW 53rd Street, Sunrise, Fla. 33351, or other suitable device, is used to monitor the speed and the distances traveled by the planter 10. As will be discussed in more detail later, preferably the output of the GPS unit 100, including the planter speed and distances traveled by the planter, is communicated to the monitor 1000 for display to the planter operator and/or for use in various algorithms for deriving relevant data used in connection with the preferred system and method of the present invention.

As best illustrated in FIGS. 1 and 3, the preferred planter monitor system 1000 preferably utilizes the existing seed sensors 200 and associated wiring harness 202 typically found on virtually all conventional planters 10. The most common or prevalent type of seed sensors are photoelectric sensors, such as manufactured by Dickey-John Corporation, 5200 Dickey-John Road, Auburn, Ill. 62615. A typical photoelectric sensor generally includes a light source element and a light receiving element disposed over apertures in the forward and rearward walls of the seed tube. In operation, whenever a seed passes between the light source and the light receiver, the passing seed interrupts the light beam causing the sensor 200 to generate an electrical signal indicating the detection of the passing seed. The generated electrical signals are communicated to the monitor 1000 via the wiring harness 202 or by a suitable wireless communication means. It should be appreciated that any other type of seed sensors capable of producing an electrical signal to designate the passing of a seed may be equally or better suited for use in connection with the system and method of the present invention. Therefore the present invention should not be construed as being limited to any particular type of seed sensor.

As previously identified, the preferred planter monitor system 1000 also utilizes load sensor 300 disposed to generate load signals corresponding to the loading experienced by or exerted on the depth regulation member 47. The load sensor 300 and associated processing circuitry may comprise any suitable components for detecting such loading conditions, including for example, the sensors and circuitry as disclosed in PCT/US2008/50427, previously incorporated herein in its entirety by reference. As discussed in more detail later, the loading experienced by or exerted on the gauge wheels 48, 50 or whatever other depth regulating member is being used, is preferably one of the values displayed to the operator on the screen of the visual display 1002 and may also be used in connection with the preferred system and method to report the occurrence of yield robbing events (i.e., loss of furrow depth or excess soil compaction) and/or for automated adjustment of the supplemental downforce, if supported by the planter.

An inclinometer 400 is preferably mounted to the front mounting bracket 20 of at least one row unit 12 of the planter 10 in order to detect the angle of the row unit 12 with respect to vertical. Because the row unit 12 is connected by a parallel linkage 16 to the transverse toolbar 14 comprising a part of the planter frame 13, the angle of the front bracket 20 with respect to vertical will substantially correspond to the angle of the frame and toolbar 13, 14. It should be appreciated that if the planter drawbar is substantially horizontal, the front bracket 20 will be substantially vertical. Thus, if the drawbar is not level, the front bracket will not be substantially vertical, thereby causing the row units to be inclined. If the row unit is inclined, the furrow opening assembly 36 will cut either a deeper or more shallow furrow then as set by the depth adjustment mechanism 67 thereby resulting in poor germination and seedling growth. As such, data from the inclinometer 400 may be used in connection with the preferred system and method to detect and/or report potential yield robbing events and/or for automatic adjustment of the planter, if so equipped, to produce the necessary correction to level the row unit. For example, if the inclinometer 400 detects that the front bracket is not substantially vertical, it may initiate an alarm condition to advise the operator that the tongue is not level, the potential effects on seed placement, and will preferably display on the monitor screen 1002 the appropriate corrective action to take.

As previously identified, the preferred planter monitor system 1000 also preferably includes a vertical accelerometer 500 and a horizontal accelerometer 600. Preferably the vertical accelerometer 500 and horizontal accelerometer 600 are part of a single device along with the inclinometer 400.

The vertical accelerometer 500 measures the vertical velocity of the row unit 12 as the planter traverses the field, thereby providing data as to how smoothly the row unit is riding over the soil, which is important because the smoothness of the ride of the row unit can affect seed spacing. For example, if a seed is discharged from the seed meter just as the row unit encounters an obstruction, such as a rock, the row unit will be forced upwardly, causing the seed to have a slight upward vertical velocity. As the row unit passes over the obstruction, and is forced back downwardly by the biasing means 18, or if the row unit enters a depression, a subsequent seed being discharged by the seed meter 30 will have a slight downward vertical velocity. Thus, all other factors being equal, the second seed with the initial downwardly imparted velocity will reach the ground surface in less time than the first seed have the initial upwardly imparted velocity, thereby affecting seed spacing. As such, data from the vertical accelerometer 500 may also be used in connection with the preferred system and method to identify and/or report seed placement yield robbing events resulting from rough field conditions, excessive planter speed and/or inadequate downforce exerted by the biasing means 18. This information may be used to diagnose planter performance for automatic adjustment and/or providing recommendations to the operator pursuant to the preferred system and method of the present invention for taking corrective action, including, for example, increasing down force to reduce vertical velocities or reducing tractor/planter speed.

The horizontal accelerometer 600, like the inclinometer 400 provides data that may be used in connection with the preferred method to diagnose planter performance and/or for providing recommendations to the operator pursuant to the preferred system and method of the present invention for taking corrective action. For example, horizontal accelerations are known to increase as the bushings of the parallel linkage 16 wear. Thus, if the ratio of the standard deviation of the horizontal acceleration over the standard deviation of the vertical acceleration increases, it is likely that the bushings or other load transferring members of the parallel linkage are worn and need to be replaced.

Figure 6:
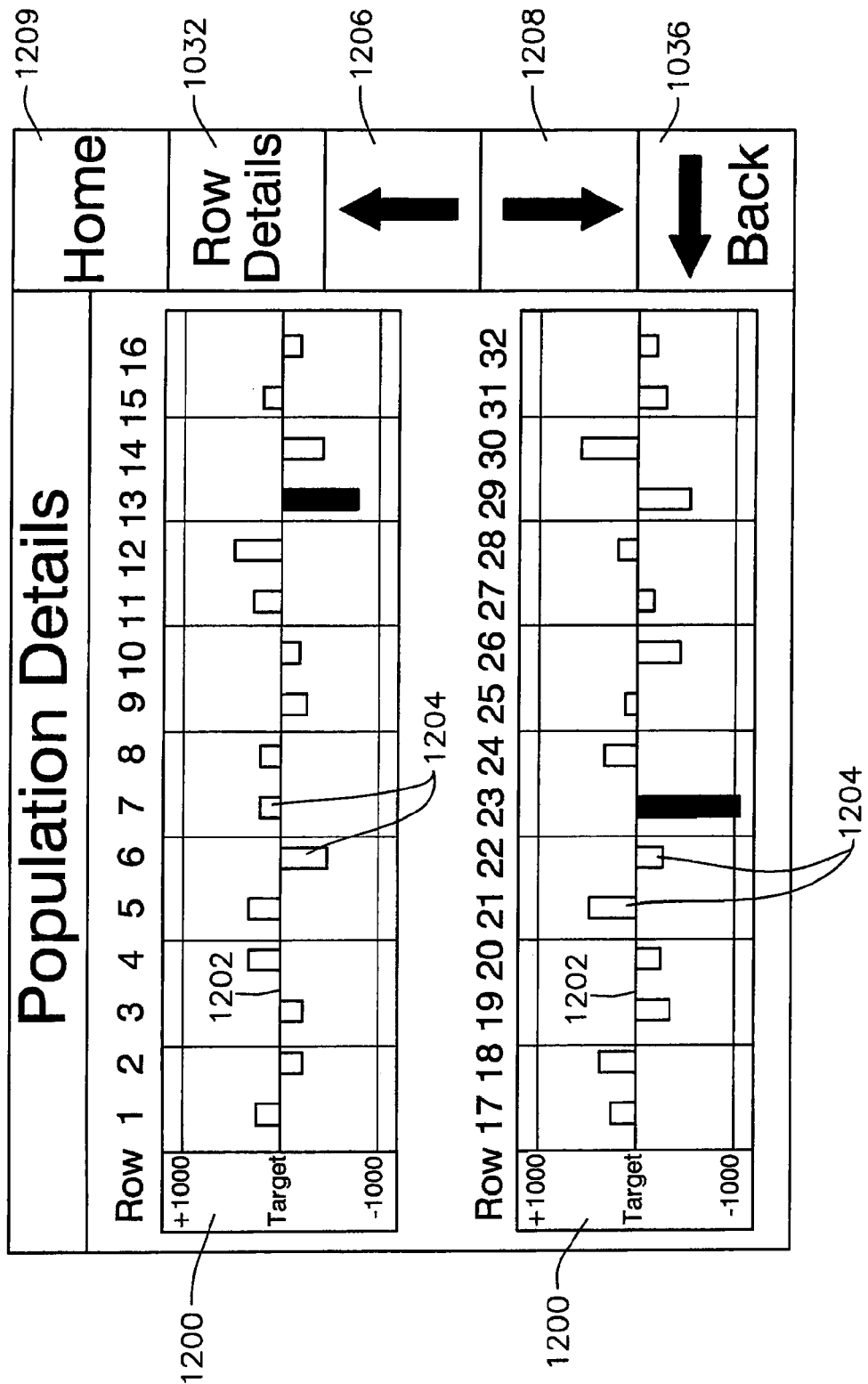
FIG. 6 is an example of the preferred embodiment of a Level 2 Population Details screen display for the monitor system of FIG. 5 showing a preferred format for reporting population performance by row.
Figure 7:
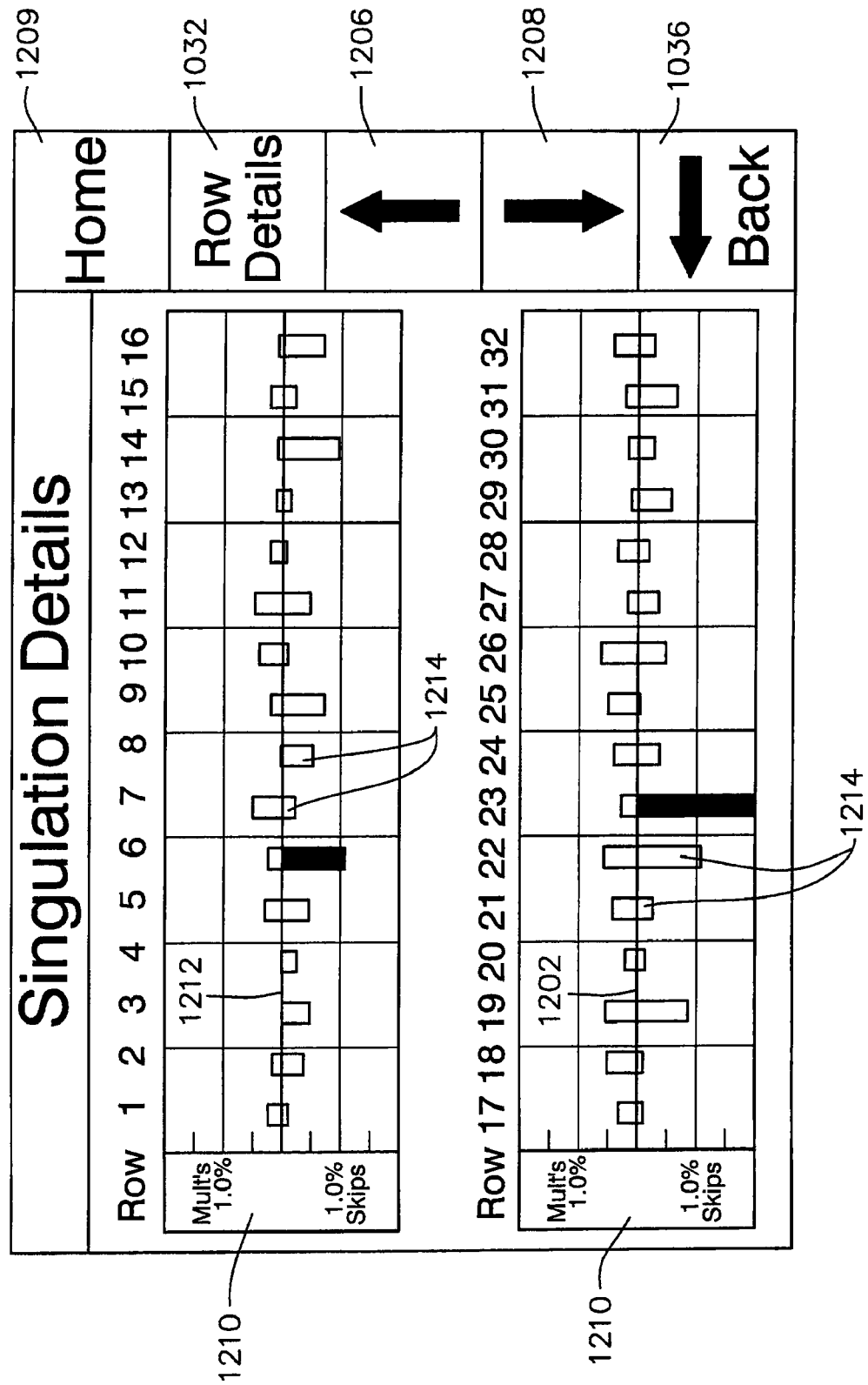
FIG. 7 is an example of the preferred embodiment of a Level 2 Singulation Details screen display for the monitor system of FIG. 5 showing a preferred format for reporting singulation performance by row.
Figure 8:
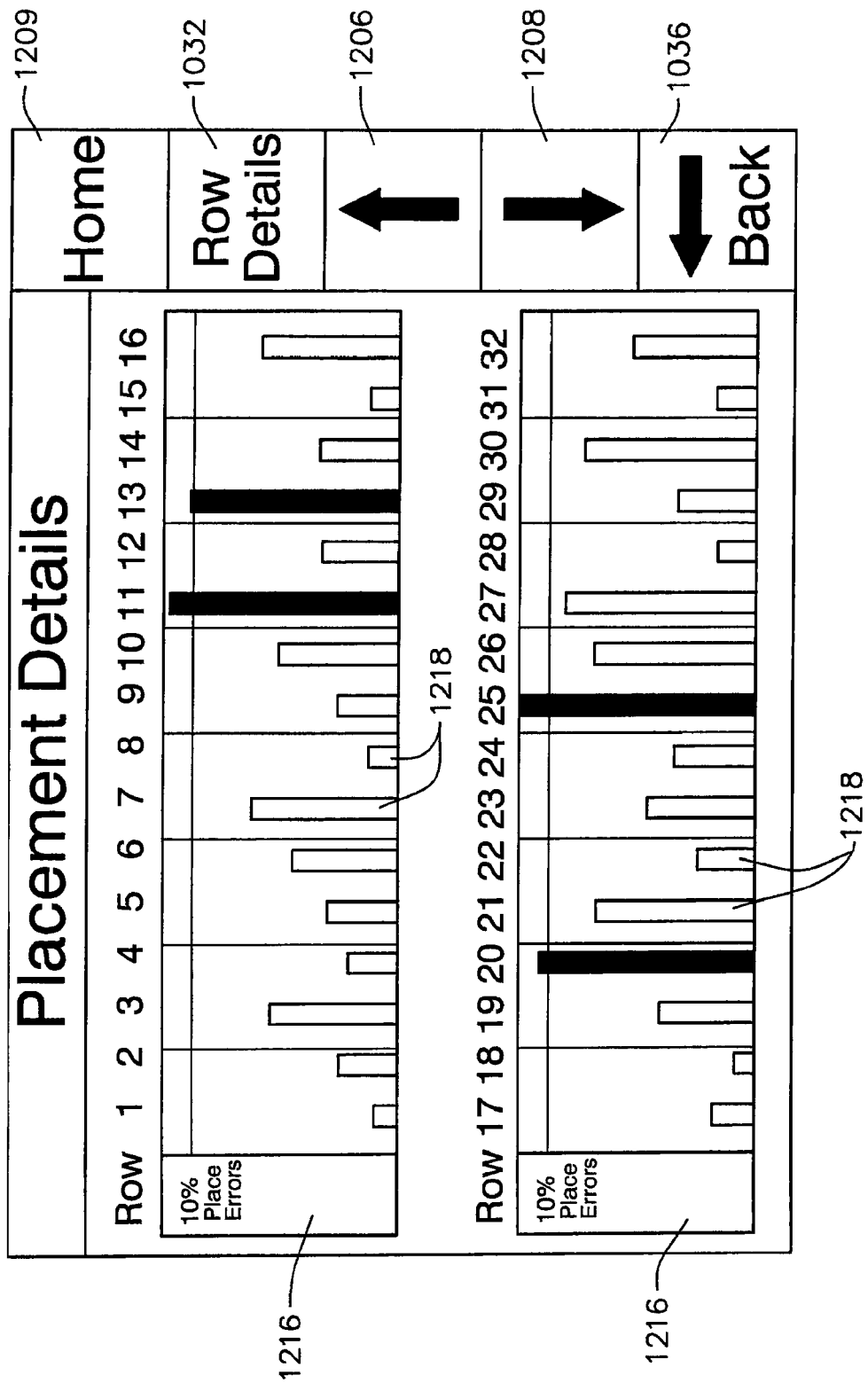
FIG. 8 is an example of the preferred embodiment of a Level 2 Placement Details screen display for the monitor system of FIG. 5 showing a preferred format for reporting placement performance by row.
Figure 10:
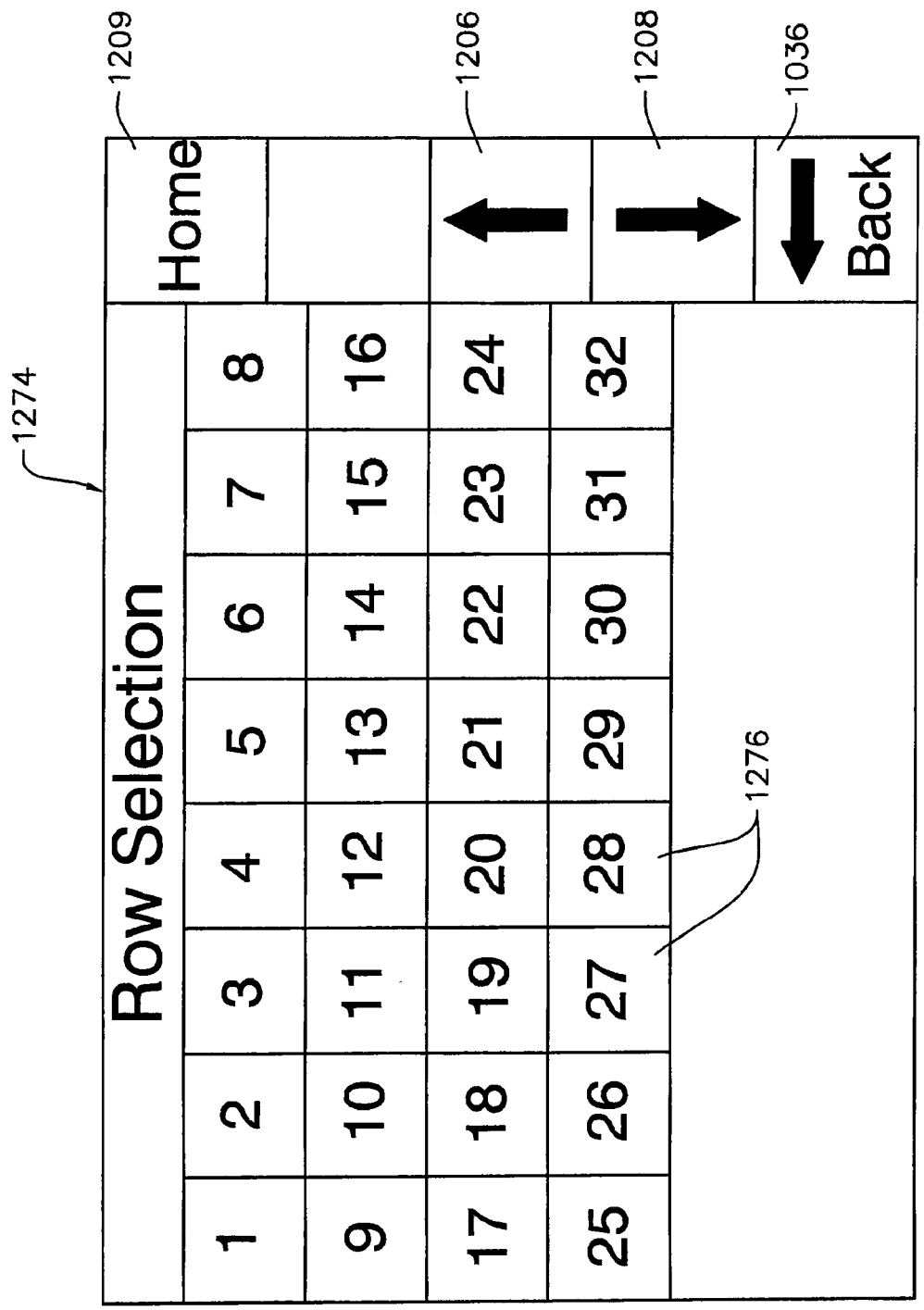
FIG. 10 is an example of a Row Selection screen display for the monitor system of FIG. 5 showing a preferred format for selecting a row of the planter to view additional details of that row such as identified in FIG. 6.
Figure 11:
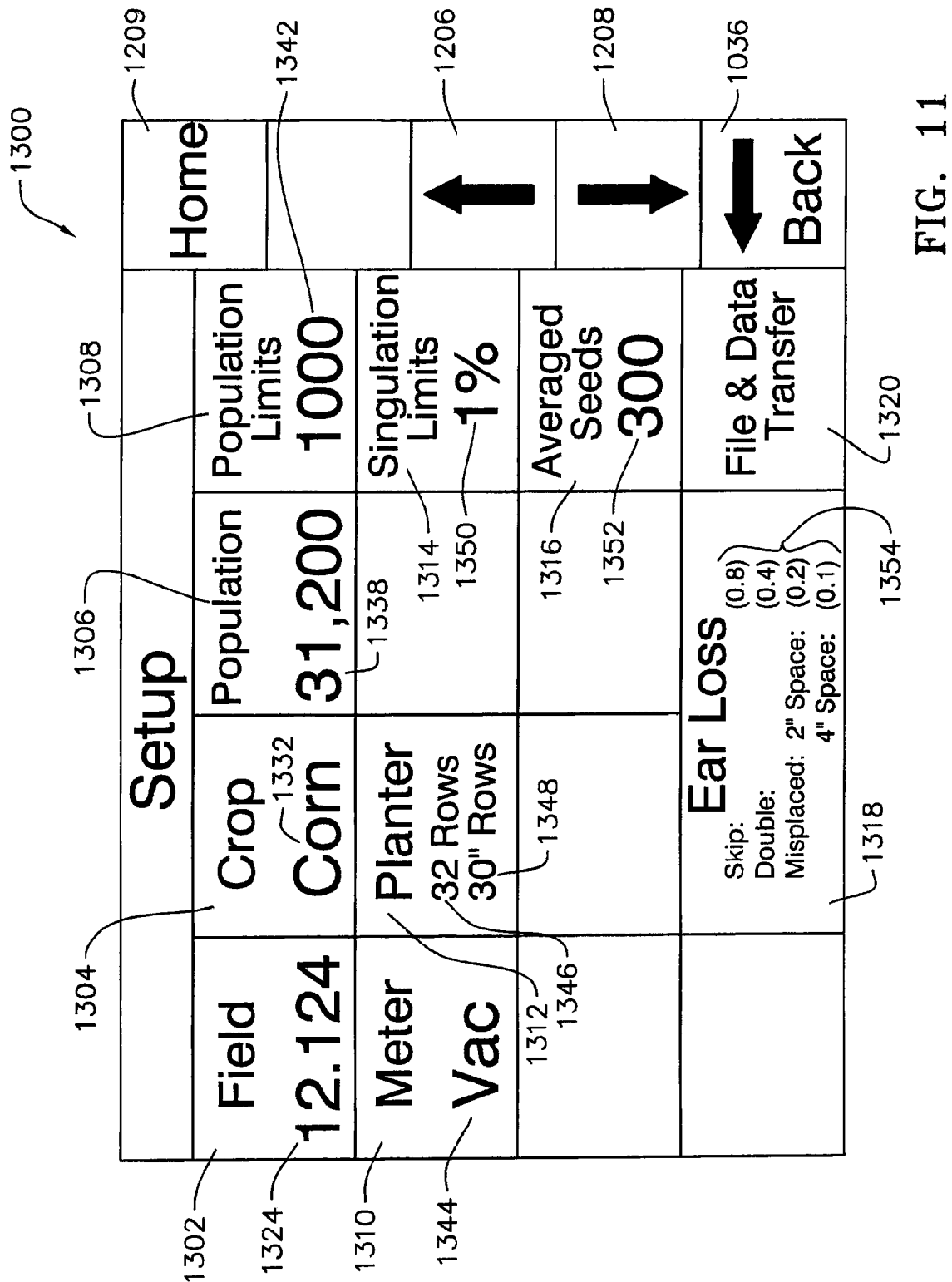
FIG. 11 is an example of a screen display for the monitor system of FIG. 5 showing a preferred format for setup and configuration.
Figure 12:
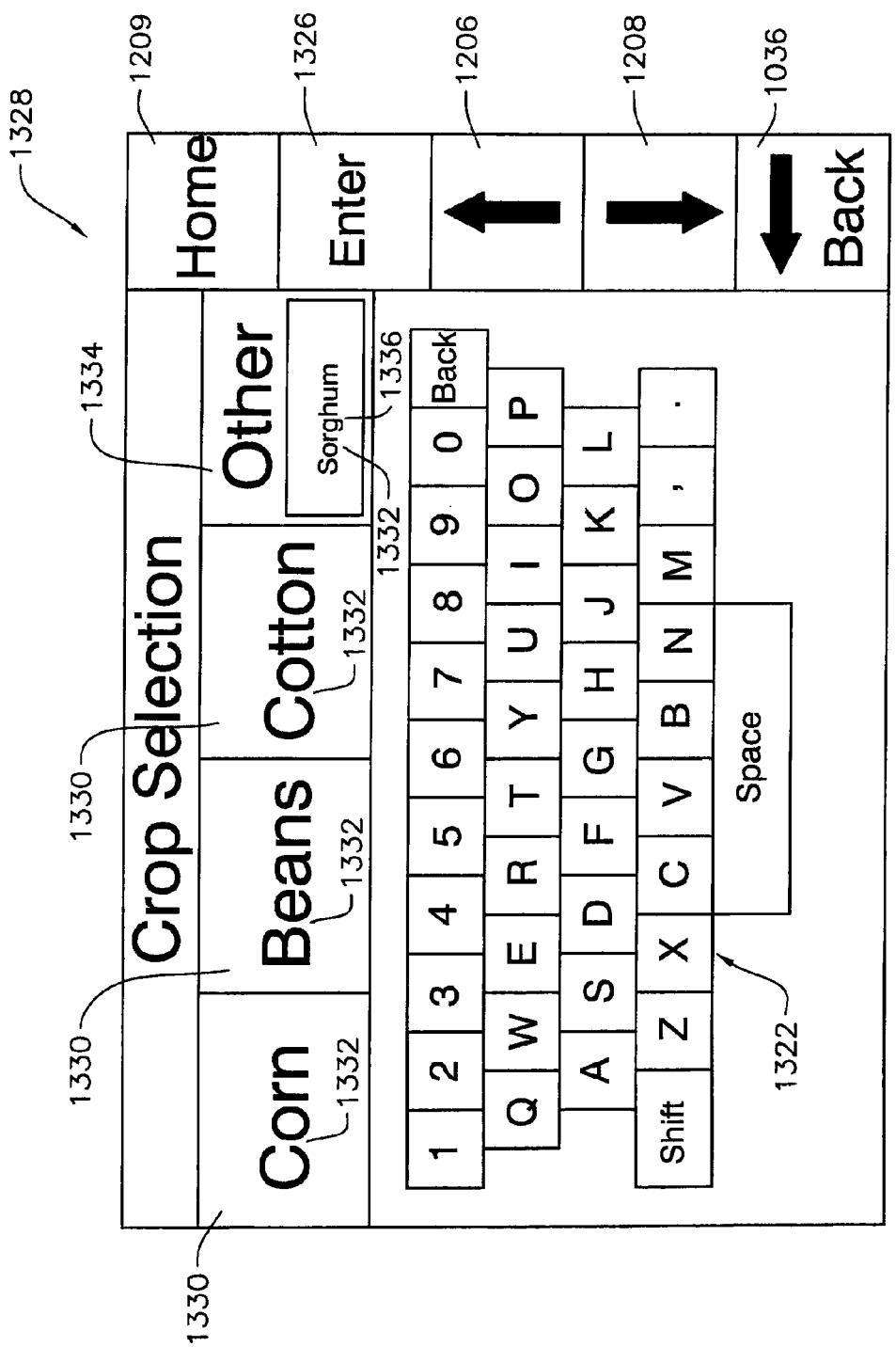
FIG. 12 is an example of a screen display for selecting or inputting crop type during setup.
Figure 13:
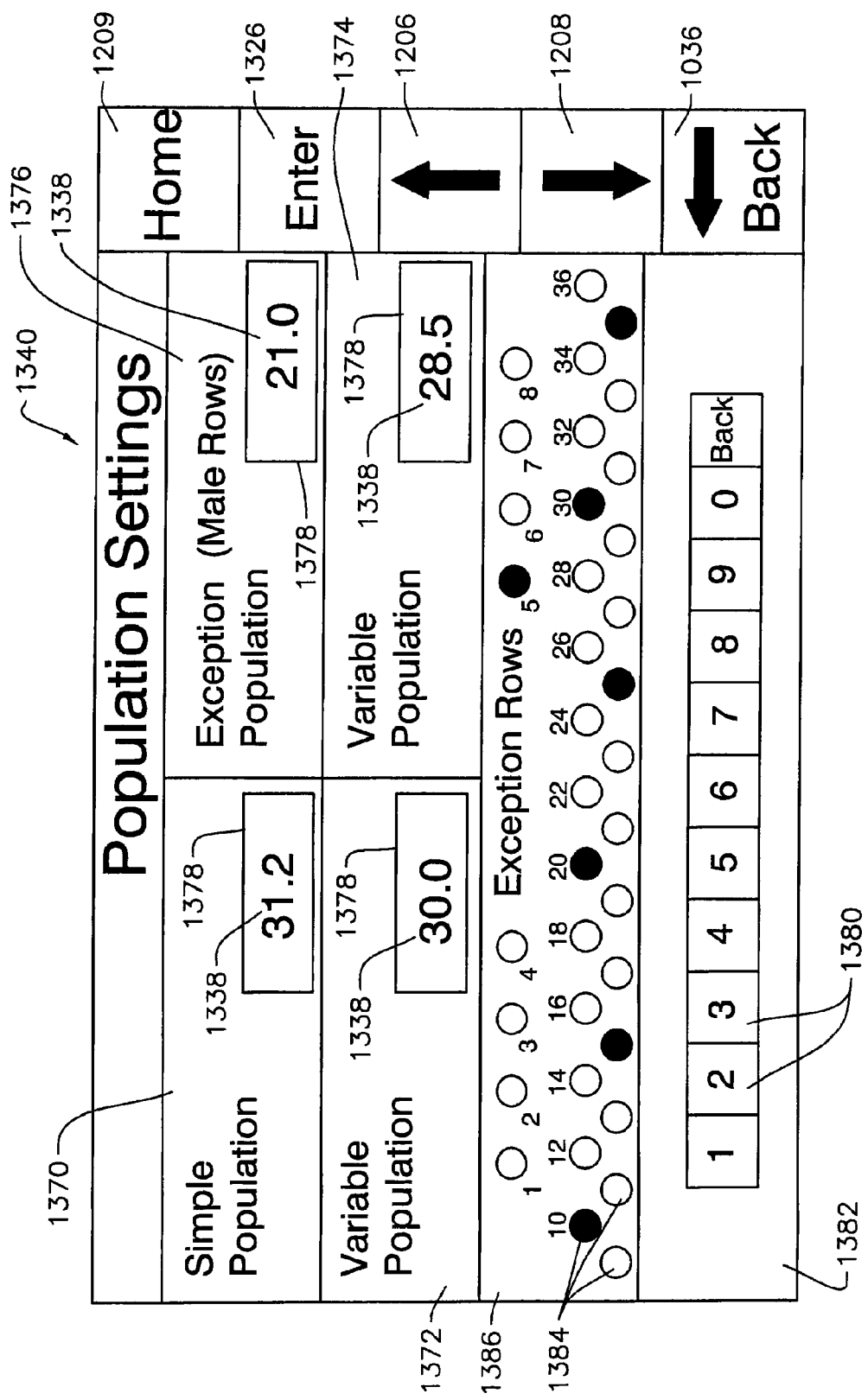
FIG. 13 is an example of a screen display for inputting population settings during setup.

Turning now to FIGS. 5-13, FIG. 5 is an example the preferred Level 1 Screen for the planter monitor system 1000; FIGS. 6-8 are examples of preferred Level 2 Screens; FIGS. 9-10 are examples of preferred Level 3 Screens; FIG. 11 is an example of a preferred Setup screen; and FIGS. 12-13 are examples of preferred Level 4 screens. Each of the screens is discussed below.

Level 1 Screen (FIG. 5)

The Level 1 Screen 1010 is so named because it is preferably the default screen that will be displayed on the monitor display 1012 unless the operator selects a different screen level to view as discussed later. The preferred Level 1 Screen 1010 includes a plurality of windows corresponding to different planter performance details, including a Seed Population Window 1012, a Singulation Window 1014, a Skips/Multiples Window 1016, a Good Spacing Window 1018, a Smooth Ride Window 1020, a Speed Window 1022, a Vacuum Window 1024 (when applicable), a Downforce Window 1028 and an Economic Loss Window 1028. Each of these windows and the method of deriving the values displayed therein are discussed below. In addition the Level 1 Screen 1010 preferably includes various function buttons, including a Setup button 1030, a Row Details button 1032, a SnapShot button 1034 and a Back button 1036, each of which is discussed later.

Population Window 1012

The Population Window 1012 preferably includes a numeric seed population value 1100, preferably updated every second (i.e., 1 Hz cycles), representing the running average of the number of seeds (in thousands) being planted per acre over a predefined sampling frequency, preferably 1 Hz. This seed population value 1100 is based on the following formula:

$$\text{Seed population 1030} = 0.001 \times \frac{SeedCount}{\text{Rows} \times \text{Spacing(ft)} \times \text{Dist(ft)}} \times 43500 \text{ ft}^2/\text{acre}$$

Where: SeedCount=Total number of seeds detected by Sensors 200 in all rows during sample frequency.

Rows=Number of planter rows designated during Setup (discussed later)

Spacing=Planter row spacing designated during Setup
Dist=Distance (ft) traveled by planter based on input from GPS unit 100 during the sample frequency Thus, for example, assuming the seed sensors 200 detect a total of 240 seeds over the preferred 1 Hz cycle, and assuming the planter is a sixteen row planter with thirty inch rows (i.e., 2.5 ft) and the average speed of the planter is six miles per hour (i.e. 8.8 ft/sec) during the 1 Hz cycle, the seed population would be:

$$\text{Seed population} = 0.001 \times \frac{240}{(16 \times 2.5 \text{ ft} \times 8.8 \text{ ft})} \times 43500 \text{ ft}^2/\text{acre} = 29.6$$

In the preferred embodiment, however, although the seed population value 1100 is updated or re-published every second, the actual seed population is not based on a single one-second seed count. Instead, in the preferred embodiment, the seeds detected over the previous one second are added to a larger pool of accumulated one-second seed counts from the preceding ten seconds. Each time a new one-second seed count is added, the oldest one-second seed count is dropped from the pool and the average seed population is recalculated based on the newest data, this recalculated average is then published every second in the Seed Population Window 1012.

In addition to identifying the seed population value 1100 as just identified, the preferred Seed Population Window 1012 also preferably displays a graph 1102 for graphical representation of the calculated average seed population 1100 relative to the target population 1338 (FIG. 11) (specified during Setup as discussed later) designated by a hash mark 1104. Corresponding hash marks 1106, 1108 represent the population deviation limits 1342 (FIG. 11) (also specified during Setup as discussed later). An indicator 1110, such as a large diamond, for example, is used to represent the calculated average population. Other distinguishable indicators 1112, such as smaller diamonds, represent the corresponding population rate of the individual rows relative to the target hash mark 1104. Additionally, the Seed Population window 1012 also preferably identifies, by row number, the lowest population row 1114 (i.e., the planter row that is planting at the lowest population rate, which, in the example in FIG. 5 is row 23) and the highest population row 1116 (i.e., the planter row that is planting at the highest population rate, which, in the example in FIG. 5 is row 19) along with their respective population rates 1118, 1120.

In the preferred system and method, the monitor preferably provides some sort of visual or audible alarm to alert the operator of the occurrence of any yield robbing events related to population. Preferably, if the yield robbing event concerns population, only the Population Window 1012 will indicate an alarm condition. An alarm condition related to population may include, for example, the occurrence of the calculated seed population value 1100 falling outside of the population deviation limits 1342 specified during setup. Another alarm condition may occur when the population of any row is less than 80% of the target population 1338. Another alarm condition related to population may include the occurrence of one or more rows falling outside the population deviation limits for a predefined time period or sampling frequency, for example five consecutive 1 Hz cycles, even though an average population of those rows is in excess 80% of the target population 1338. Yet another alarm condition may occur when there is a "row failure" which may be deemed to occur if the sensor 200 fails to detect the passing of any seeds for a specified time period, such as four times $T_{presumed}$ (discussed below).

As previously identified, upon the occurrence of any of the foregoing alarm conditions, or any other alarm condition as may be defined and programmed into the monitor system 1000, the Population window 1012 preferably provides a visual or audible alarm to alert the operator of the occurrence of the alarm condition. For example, in the preferred embodiment, if the calculated seed population value 1100 is within the specified population deviation 1342 (e.g., 1000 seeds) of the target population 1338 (e.g., 31200 seeds), the background of the Population Window 1012 is preferably green. If, however, the calculated seed population value 1100 falls below the target population 1338 by more than the specified population deviation, the Population Window 1012 preferably turns yellow. Alternatively, the Population Window 1012 may flash or provide some other visual or audible alarm under other alarm conditions. Obviously, many different alarm conditions can be defined and many different visual and/or audible indications of an alarm condition may be programmed into the monitor system 1000 as recognized by those of skill in the art.

Furthermore, in the preferred embodiment, the touch screen GUI 1004 of the monitor system 1000 allows the operator to select different areas of the Population Window 1012 which will cause the monitor to display additional relevant detail related to the feature selected. For example, if the operator touches the calculated seed population value 1100, the screen changes to display the Level 2 Population Details screen (FIG. 6). If the operator touches the area of the screen in the Population Window 1012 in which the low population row 1114 is displayed, the screen changes to the Row Details screen (FIG. 9) which displays the details of that specific row. Similarly, if the operator touches the area of the screen in the Population Window 1012 in which the high population row 1116 is displayed, the screen changes to the Row Details screen (FIG. 9) which displays the details of that specific row.

Singulation Window 1014

The Singulation Window 1014 preferably includes a numeric percent singulation value 1122, preferably published at 1 Hz cycles, representing the running average of the percentage singulation over the predefined sampling frequency, preferably 2 kHz (0.5 msec). In order to determine the percent singulation value 1122 it is first necessary to identify the skips and multiples occurring during the sampling period. Once the number of skips and multiples within the sampling period is known in relation to the number of "good" seeds (i.e., properly singulated seeds), then the percent singulation value 1100 can be calculated as identified later.

The preferred system and method includes a criteria for distinguishing when a skip or a multiple occurs. In the preferred system and method, every signal generated by the sensor 200 is classified into one of six classifications, i.e., "good", "skip", "multiple", "misplaced2", "misplaced 4", and "non-seed". A "good" seed is recorded when a signal is generated within a predefined time window when the signal was expected to have occurred based on planter speed and set target population which together define the presumed time interval ($T_{presumed}$). A "skip" is recorded when the time between the preceding signal and the next signal is greater than or equal to $1.65 T_{presumed}$. A "multiple" is recorded when the time between the preceding signal and the next signal is less than or equal to $0.35 T_{presumed}$. In order to accurately distinguish between metering errors resulting in true skips and true multiples as opposed to the seeds simply being misplaced due to placement errors resulting after discharge by the seed meter (i.e., ricochet, differences in vertical acceleration, etc.), the initial classifications are preferably validated before being recorded as skips or multiples. To validate the initial classifications, the monitor is programmed to compare changes in the average value for the last five time intervals relative to the average for the last twenty time intervals ($T20_{Avg}$). In the preferred system, if the 5-seed interval average ($T5_{Avg}$) is more than $1.15 T20_{Avg}$ for more than three consecutive calculations, then the original classification of a skip is validated and recorded as a true skip. If $T5_{Avg}$ is less than $0.85 T20_{Avg}$ for more than three consecutive calculations, then the original classification of a multiple is validated and recorded as a true multiple. If the foregoing limits are not exceeded, then the originally classified skip is reclassified as "good," and the originally classified multiple is reclassified as a "misplaced" seed. Thus, by validating the original classifications, metering errors are distinguished from placement errors, thereby providing the operator with more accurate information as to the planter operation and the occurrence of yield robbing events.

The "misplaced2" classification refers to a seed that is within two inches of an adjacent seed. Before a seed is recorded as a "misplaced2" the average spacing is calculated based on population and row spacing. A time threshold ($T2_{threshold}$) is calculated to classify "misplaced2" seeds by the equation:

$$T2_{threshold} = T_{presumed} \times (2 \div \text{average spacing(inches)}).$$

The "misplaced4" classification refers to a seed that is within four inches of an adjacent seed. A time threshold (T4threshold) is calculated to classify "misplaced 4" seeds by the equation:

$$T4_{threshold} = T_{presumed} \times (4 \div \text{average spacing(inches)}).$$

Thus, a seed is classified as a misplaced4 seed when the time interval between the preceding signal and the next signal is greater than the $T2_{threshold}$ but less than $T4_{threshold}$.

In order to account for occasional instances when a train of dust or other debris cascades through the seed tube resulting in a rapid generation of signal pulses, the monitor system preferably classifies the entire series of rapid signal pulses as "non-seed" occurrences (even though seeds were still passing through the tube along with the train of dust or debris) rather than recording the rapid signal pulses as a string of multiples or misplaced seeds. However, in order to maintain a relatively accurate seed count and relatively accurate singulation percentage, the monitor system is preferably programmed to fill in the number of seeds that passed through (or should have passed through) the seed tube along with the cascade of dust and debris. Thus, in a preferred embodiment, when there are more than two pulses in series with an interval of less than $0.85 T_{presumed}$, all the signal pulses detected after that occurrence are classified as non-seeds until there is an interval detected that is greater than $0.85 T_{presumed}$. Any signal pulse classifying as a non-seed is not taken into account in any calculations for determining percent singulation values 1122. In the preferred embodiment, in order to maintain correct population values 1100 when the interval is less than $0.85 T_{presumed}$, the interval is measured from the last "good" seed occurrence prior to the rapid signal event that produced the "non-seed" classification until the first "good" seed classification. The accumulated seed value is corrected or adjusted by adding to the count of "good" seeds the number of occurrences corresponding to the number of times $T_{presumed}$ can be divided into non-seed classification time period leaving no remainder greater than $1.85 T_{presumed}$.

It should be appreciated, that because $T_{presumed}$ will vary with planter speed, which continually changes during the planting operation as the planter slows down or speeds up based on field conditions (i.e., hilly terrain, when turning or when approaching the end of the field, etc.), $T_{presumed}$ is a dynamic or continuously changing number. One method of deriving $T_{presumed}$ is as follows:

a) Determine average across all rows of previous 1 seed ($T1_{Avg}$) as follows:
 1) For each row, store the time interval from the last seed. Sort from minimum to maximum.
 2) Calculate the average time interval across all rows.
 3) If the ratio of the smallest interval divided by the average interval from step 2 is ≤0.75, then remove lowest number and repeat step 2.
 4) If the ratio of the maximum interval divided by the average interval is ≥1.25, then remove maximum interval and repeat step 2.
 5) $T1_{Avg}$ is the average time interval across all rows where the ratio of smallest time interval divided by the average time interval is ≥0.75 and ratio of the maximum interval divided by the average interval is ≤1.25.

b) Determine average time interval across all rows of previous 5 seeds ($T5_{Avg}$) as follows:
 1) For each row, store the time intervals of last five seeds in circular buffer; exclude intervals where the time interval to the next seed is less than $0.5 T1_{Avg}$ or greater than $1.5 T1_{Avg}$.
 2) Calculate the row average (i.e., the average time interval for each row) by dividing the sum of the stored time intervals from step 1 by the seed count from step 1.
 3) Determine the row ratio.
  if the time interval since the last seed is ≤1.5×row average, then row ratio=1
  if the time interval since the last seed is >1.5×row average, then row ratio=(1−(last time interval÷(row average×5)))
 4) For each row, multiply the row ratio by the row average and sum the products.
 5) Calculate $T5_{Avg}$ by dividing the value from step 4 by the sum of the row ratios.

c) Determine average time interval across all rows of previous 20 seeds ($T20_{Avg}$)
 1) For each row, store the time intervals of last 20 seeds in circular buffer; exclude intervals where the time interval to the next seed is less than $0.5 T1_{Avg}$ or greater than $1.5 T1_{Avg}$.
 2) Calculate the row average (i.e., the average time interval for each row) by dividing the sum of the stored time intervals from step 1 by the seed count from step 1.
 3) Determine the row ratio.
  if the time interval since the last seed is ≤1.5×row average, then row ratio=1
  if the time interval since the last seed is >1.5×row average, then row ratio=(1−(last time interval÷(row average×20)))
 4) Calculate $T20_{Avg}$ by dividing the value from step 4 by the sum of the row ratios.

d) Determine $T_{presumed}$:
 1) If all values have been filtered out, then $T_{presumed} = T1_{Avg}$.
 2) Else, if $T20_{Avg} \geq 1.1 \times T5_{Avg}$ and $T20_{Avg} \geq T1_{Avg}$, then $T_{presumed} = T5_{Avg}$.
 3) Else, if $T20_{Avg} \leq 0.9 \times T5_{Avg}$ and $T20_{Avg} \leq T1_{Avg}$, then $T_{presumed} = T5Avg$.
 4) Else, $T_{presumed} = T20_{Avg}$.

Obviously other methods of deriving $T_{presumed}$ may be equally suitable and therefore the present invention should not be construed as being limited to the foregoing method for deriving $T_{presumed}$.

The percentage of skips (% Skips) 1124 can be determined by adding the total number of skips detected across all rows over a predefined seed count (preferably the Averaged Seed value 1302 specified during Setup (default is 300 seeds)) and then dividing the total number of skips by that seed count. Similarly, the percentage of multiples (% Mults) 1126 can be determined by adding the total number of multiples detected across all rows over the same predefined seed count and then dividing the total number of multiples by the predefined seed count. The percent singulation value 1122 may then be calculated by adding the % Skips 1124 and % Mults 1126 and subtracting that sum from 100%.

In addition to displaying the percent singulation value 1122, the Singulation Window 1014 also preferably displays a graph 1128 for graphically representing the numeric percentage singulation 1122 relative to the 100% singulation target. The graph 1128 also preferably displays hash marks 1130 incrementally spaced across the graph 1128 corresponding to the Singulation Deviation limits 1350 (FIG. 11) specified during setup. An indicator 1132, such as a large diamond, preferably identifies the percent singulation value 1122 relative to the 100% singulation target. Other distinguishable indicators 1134, such as smaller diamonds, preferably indicated the corresponding singulation percentages of the individual rows relative to the 100% singulation target. Additionally, the Singulation Window 1014 also preferably identifies numerically the planter row that is planting at the lowest singulation percentage 1136 (which in the example in FIG. 5 is row 23) along with the percent singulation value 1138 for that row.

Similar to the Population Window 1012 previously discussed, the Singulation Window 1014 preferably provides some sort of visual or audible alarm to alert the operator of the occurrence of any yield robbing events related to singulation. An alarm condition related to singulation may include, for example, the occurrence of the percent singulation value 1122 falling outside of the singulation deviation limits 1350 specified during setup. Another alarm condition may include, for example, when an average percent singulation of two or more rows exceeds the singulation deviation limits 1350 for five consecutive 1 Hz calculations, for example. Another alarm condition may include, when one row exceeds the singulation deviation limits 1350 by more than two times for five consecutive 1 Hz calculations, for example. As before, many different alarm conditions can be defined and many different visual and/or audible indications of an alarm condition may be programmed into the monitor system 1000 to cause the Singulation Window 1014 to provide the operator with visual or audible alarms to indicate the occurrence of a yield robbing event related to singulation. All such variations in alarm conditions and alarm indications are deemed to be within the scope of the present invention.

Furthermore, in the preferred embodiment, the preferred touch screen GUI 1004 of the monitor system 1000 allows the operator to select different areas of the Singulation Window 1014 which will cause the monitor to display additional relevant detail related to the feature selected. For example, if the operator touches the calculated percent singulation value 1122, the screen changes to display the Level 2 Singulation Details screen (FIG. 7). If the operator touches the area of the screen in the Singulation Window 1014 in which the low singulation row 1136 is displayed, the screen changes to the Row Details screen (FIG. 9) which displays the details of that specific row.

Skips/Mults Window 1016

The Skips/Mults Window 1016 preferably displays the value of the calculated % Skips 1124 and % Mults 1126 as previously identified. As with the other Windows previously described, the Skips/Mults Window 1016 may provide some sort of visual or audible alarm to alert the operator if the % Skips or % Mults exceed predefined limits.

Good Spacing Window 1018

The Good Spacing Window 1018 preferably includes a numeric percent good spacing value 1140 representing the running average percentage of "good" seed spacing versus "misplaced" seeds, i.e., the number of seeds categorized as "misplaced2" or "misplaced4" (as previously defined) over the predefined sampling frequency (preferably 0.1 Hz). Once the number of misplaced2 and misplaced4 seeds are known in relation to the number of seeds during the sample period, then the percentage of misplaced2 seeds (% MP2) and the percent misplaced4 seeds (% MP4) relative to good spaced seeds is readily ascertained. Likewise, the percent good spacing value 1140 is readily ascertained by subtracting the sum of % MP2 and % MP4 from 100%.

In addition to displaying the calculated percent good spacing value 1140, the Good Spacing Window 1018 also preferably includes a graph 1142 for graphically representing the percent good spacing value 1140 relative to the 100% good spacing target. Hash marks 1144 are preferably provided to identify a scale from 80% to 100% at 5% increments. An indicator 1146, such as a large diamond, preferably identifies the calculated good spacing value 1140 relative to the 100% good spacing target. Other distinguishable indicators 1148, such as smaller diamonds, preferably identify the corresponding good spacing percentages of the individual rows relative to the 100% goods spacing target. Additionally, the Good Spacing Window 1018 also preferably identifies numerically the planter row that is planting at the lowest good spacing percentage 1150 (which in the example in FIG. 5 is row 9) along with the numerical percent good spacing value 1152 for that row.

Similar to the other Windows 1012, 1014 the Good Spacing Window 1018 preferably provides some sort of visual or audible alarm to alert the operator of the occurrence of any yield robbing events related to spacing. An alarm condition related to spacing may include, for example, if the overall percent good spacing value 1140 or row specific spacing value falls below a predetermined deviation limit, such as 90%. Many different alarm conditions can be defined and many different visual and/or audible indications of an alarm condition may be programmed into the monitor system 1000 to cause the Good Spacing Window 1018 to provide the operator with visual or audible alarms similar to those described with the other Windows 1012, 1014 to indicate the occurrence of a yield robbing event related to spacing. All such variations in alarm conditions and alarm indications are deemed to be within the scope of the present invention.

In the preferred embodiment, the touch screen GUI 1004 of the monitor system 1000 allows the operator to select different areas of the Good Spacing Window 1018 which will cause the monitor to display additional relevant detail related to the feature selected. For example, if the operator touches the calculated percent good spacing value 1140, the screen changes to display the Level 2 Placement Details screen (FIG. 8). If the operator touches the area of the screen in the Good Spacing Window 1018 in which the low row 1150 is displayed, the screen changes to the Row Details screen (FIG. 9) which displays the details of that specific row.

Smooth Ride Window 1020

The Smooth Ride Window 1020 preferably displays the smooth ride percentage value 1154. The smoothness of the ride is estimated based on the percentage of time the vertical velocity of the row unit is less than a predefined vertical velocity limit (VVL). In the preferred embodiment, the VVL is four inches per second (4 in/sec). This VVL was selected based on empirical data which established that seed spacing was measurably affected when the row unit was subjected to vertical velocities above 4 in/sec.

The number of times the vertical velocity of the row unit 12 on which the sensor 500 is mounted exceeds the VVL is counted over a predefined time period (preferably 30 seconds). The percentage of time during the predefined time period that the VVL was exceeded is then calculated for each sensor 500 and then an average is calculated (Ave % T>VVL). The smooth ride percentage value 1154 is then calculated by subtracting the value of Ave % T>VVL from 100%.

In addition to displaying the calculated smooth ride percentage value 1154, the Smooth Ride Window 1020 also preferably displays a graph 1156 to graphically represent the smooth ride percentage value 1154 relative to the 100% smooth ride target. Incremental hash marks 1158 preferably identify a scale, such as at 85%, 90% and 95%, across a predefined range, preferably from a low of 80% smooth ride to 100% smooth ride. An indicator 1160, such as a large diamond, preferably identifies the calculated smooth ride percentage value 1154 relative to the 100% smooth ride target. Other distinguishable indicators 1162, such as smaller diamonds, preferably identify the corresponding smooth ride percentages of the individual rows relative to the 100% smooth ride target. Additionally, the Smooth Ride Window 1020 also preferably identifies numerically the planter row that is planting at the lowest smooth ride percentage 1164 (which, in the example in FIG. 5 is row 14) along with the numerical smooth ride percentage value 1166 for that row.

As with the other Windows 1012, 1014, 1018 the Smooth Ride Window 1020 preferably provides some sort of visual or audible alarm to alert the operator of the occurrence of any yield robbing events related to the smoothness of the ride. An alarm condition related to ride smoothness may include, for example, if the overall smooth ride percentage 1154 or any row specific smooth ride percentage falls below a predetermined deviation limit, such as 90%. Also as with the other Windows, many different alarm conditions can be defined and many different visual and/or audible indications of an alarm condition may be programmed into the monitor system 1000 to cause the Smooth Ride window 1020 to provide the operator with visual or audible alarms to indicate the occurrence of a yield robbing event related to ride smoothness. All such variations in alarm conditions and alarm indications are deemed to be within the scope of the present invention.

Speed Window 1022

The Speed Window 1022 preferably displays the velocity 1168 of the planter in miles per hour (mph). In the preferred embodiment, the velocity 1168 is preferably averaged over the last five seconds of data collected by the GPS unit 100 unless the planter acceleration ($\Delta$V/$\Delta$t) is greater than 1 mph/sec, in which event, the velocity 1168 is preferably displayed as the actual velocity collected by the GPS unit 100.

As with the other Windows previously described, the Speed Window 1022 may provide some sort of visual or audible alarm to alert the operator if the speed falls below or exceeds predefined limits. Additionally, if the processing circuitry is programmed to diagnose planter performance and to logically identify if speed is a contributing factor to a low smooth ride percentage 1154 or low good spacing value 1140, for example, an alarm condition may be triggered producing a visual or audible indication as previously described in connection with the other Windows.

Vacuum Window 1024

The Vacuum Window 1024 preferably displays the vacuum value 1170 in inches of water (in $H_2O$). If the type of meter selected during setup was other than "vacuum" the Vacuum Window 1024 is preferably blank or not displayed. If "vacuum" was selected during setup, but no vacuum sensor 700 is connected to the monitor 1000 or data from the vacuum sensor 700 is otherwise not being communicated to the monitor 1000, the Vacuum Window 1024 may show a zero vacuum value, or the window may be blank or not displayed.

As with the other Windows previously described, the Vacuum Window 1024 may provide some sort of visual or audible alarm to alert the operator if the vacuum falls below or exceeds predefined limits. Additionally, if the processing circuitry is programmed to diagnose planter performance and to logically identify if the vacuum is a contributing factor to a low singulation percentage 1122 or poor spacing percentage 1140, or excessive % Skips 1126 or % Mults 1124, for example, an alarm condition may be triggered producing a visual or audible indication as previously described in connection with the other Windows.

Downforce Window 1026

The Downforce Window 1026 preferably displays a ground contact parameter 1172 (preferably as a percentage of ground contact over a predefined sampling period). The Downforce Window 1026 may also include an area for displaying the average downforce value 1174 and/or alternatively, or in addition, the Downforce window 1026 may display the "load margin" 1175 (not shown). The percent ground contact parameter 1172 is preferably derived as more fully explained in PCT/US2008/50427, previously incorporated herein by reference. The average downforce value 1174 may be derived by averaging the detected load values over a predefined time period across all load sensors 300 on the planter. The load margin 1175 is preferably calculated and/or derived by any of the methods disclosed in PCT/US2008/50427. The downforce value 1174 and/or load margin 1175 may also be displayed graphically as disclosed in PCT/US2008/50427.

As with the other Windows previously described, the Downforce Window 1026 may provide some sort of visual or audible alarm to alert the operator if the downforce, load margin, or the ground contact parameter exceeds or falls below predefined limits. Additionally, if the processing circuitry is programmed to diagnose planter performance and to logically identify if a low ground contact parameter and/or low or excessive downforce or load margin is a contributing factor to a low smooth ride percentage 1154, for example, an alarm condition may be triggered producing a visual or audible indication as previously described in connection with the other Windows.

Economic Loss Window 1028

The Economic Loss Window 1028 preferably displays the economic loss value 1176 in dollars lost per acre ($Loss/acre) attributable to the various yield robbing events. The calculated economic loss value 1176 may be continually displayed or the value may only be displayed only upon an alarm condition, such as when the value exceeds a predefined value, such as, for example, $3.00/acre. If an alarm condition is not present, the Economic Loss Window 1028 may simply display the word "Good" or some other desired designation.

In the preferred embodiment each occurrence of a yield robbing event is associated with an economic loss factor. In the preferred embodiment, the economic loss factor is an Ear Loss (EL) factor 1310. For example, empirical data has shown that, when compared to a plant maturing from a seed properly spaced from adjacent seeds (typically six to seven inches for thirty inch rows at plant populations around 32000 seeds/acre), if a seed is misplaced such that it is only two inches from an adjacent seed (i.e., misplaced2), the net loss will be about 0.2 ears (i.e., EL=0.2). A misplaced seed that is only four inches from an adjacent seed (i.e., misplaced4) will have a net loss of about 0.1 ears (i.e., EL=0.1). A skip has been found to result in a net loss of 0.8 ears (EL=0.8). A double has been found to result in a net loss of 0.4 ears (EL=0.4).

The foregoing EL factors assume that the grower is planting "flex" hybrids as opposed to "determinate" hybrids. Simply described, a flex hybrid is one where a plant will produce larger ears depending upon seed spacing due to less competition for sunlight and nutrients. Thus, for example, if there is a space larger than four inches between an adjacent plant in a row, a flex hybrid plant will presumably receive additional sunlight and more nutrients than seeds spaced at four inches or less, enabling it to produce a larger ear with more kernels. By contrast, a determinate hybrid will have the same ear size regardless of increased seed spacing.

With the foregoing understanding, based on empirical data, the skip EL factor was derived by taking into account that although one ear has been lost due to the skip, the two adjacent plants on either side of the skip each increase their respective ear size by 10%. Thus, the net ear loss for a skip is only 0.8 ears instead of a whole ear (i.e., −1+0.1+0.1=−0.8). For a further example, if future hybrids have the ability to increase ear size by 50% on either side of a skip, then the net ear loss would approach zero as each adjacent plant has added 50%, thereby making up for the entire lost ear (i.e., −1+0.5+ 0.5=0.0). Thus, it should be understood that these EL factors may change over time as the characteristics of corn hybrids continue to evolve and improve. As such, in the preferred embodiment, the default EL factors may be varied by the operator. By associating an EL factor to each occurrence of a skip, multiple, misplaced2 and misplaced4 seed, an economic loss attributable to each of these yield robbing events over a sampling period can be determined.

In addition to skips, multiples and misplaced seeds, the loss of ground contact and excessive downforce are also yield robbing events. Accordingly, in the preferred monitor system EL factors are also associated with each of these yield robbing events.

The economic loss attributed to excessive downforce is preferably based on load margin 1175 as previously discussed in connection with the Downforce Window 1026 and as disclosed in PCT/US2008/50427. In the preferred system, the following EL factors are applied based on the magnitude of the load margin:

1) If load margin<50 lbs, EL=0
2) If 50 lbs≤load margin≤100 lbs, EL=0.05
3) If 100 lbs≤load margin≤200 lbs, EL=0.1
4) If load margin>200 lbs=0.15

As disclosed in the PCT/US2008/50427, the sampling period or frequency of detecting the load margin may vary. However, in the preferred monitor system of the present invention, the sampling period is preferably the same as the seed planting rate such that a load margin is calculated with respect to each seed. Accordingly, an EL factor based on load margin can be applied to each seed planted. With an EL factor assigned to the load margin for each seed planted, an average EL (i.e., $EL_{Avg\text{-}Excess\ Load}$) factor for a given sampling period may then be calculated. The $EL_{Avg\text{-}Excess\ Load}$ factor multiplied by the number of seeds in the sampling period may be used for determining the percentage of yield loss attributable to load margin during the sampling period as discussed below.

As for the economic loss attributable to loss of ground contact, it should be appreciated that the longer the duration that the depth regulating member of the row unit is not in contact with the soil, the greater will be the loss in depth of the furrow. In the preferred system an EL factor of 0.5 is multiplied by the percentage of time during a sampling period that there has been loss of ground contact (% Contact Lost) to determine the percentage of yield loss attributable to loss of ground contact during the sampling period. The sampling period may be any desired time period, but in the preferred embodiment, the sampling period for this EL factor is preferably the time required to plant 300 seeds at the seed population specified during Setup.

In order to provide an economic loss information in a format useful to the operator, the preferred embodiment displays the economic loss in dollars lost per acre (i.e., $Loss/Acre). However, it should be appreciated that the economic loss may be presented in any desired units. Under the preferred $Loss/Acre units, the economic loss may be calculated by multiplying the percentage of yield lost due to the yield robbing event by the projected yield and multiplying that product by the price of the grain. Accordingly, in the preferred embodiment, the $Loss/Acre may be calculated by the following formula:

$$\$Loss/Acre=\%Yield\ Lost \times Population \times (Bushels/Ear) \times (Price/Bushel)$$

Where: % Yield Lost=Sum of all calculated yield losses attributable to all occurrences during the sampling period (e.g., 300 seeds) of skips, multiples, misplaced2, misplaced4, ground contact loss and load margin; i.e., 0.8(% Skips)+0.4 (% Mults)+0.2(% MP2)+0.1 (% MP4)+0.5 (% Contact Loss)+$EL_{Avg\text{-}Excess\ Load}$(300 seeds). Note, the foregoing EL factors may vary as set by the operator during Setup as previously described.

Population=The target seed population specified during setup

Bushels/Ear=Estimated number of ears required to produce one bushel of shelled corn (default=1 bu/140 ears); preferably configurable through Setup Price/Bushel=Estimated price of corn per bushel (default=$2.50/bu); preferably configurable through Setup As with the other Windows previously described, the Economic Loss Window 1028 may provide some sort of visual or audible alarm to alert the operator if the economic loss exceeds a predefined limit. Additionally, the Economic Loss Window 1028 may be associated or tied to the other Windows 1012, 1014, 1016, 1018, 1020, 1022, 1024, 1026 such that if an alarm condition is met in any of these other Windows, and such alarm condition is found to be the contributing factor to the alarm condition in the Economic Loss Window, then both Windows produce a visual or audible indication of the alarm condition as previously described in connection with the other Windows.

Setup Button 1030

Upon pressing the Setup button 1030, the monitor 1000 is preferably programmed to display the Setup screen 1300 (FIG. 11) through which the operator can make selections and/or input data via the preferred touch screen GUI 1004.

Row Details Button 1032

Upon pressing the Row Details button 1032, the monitor is preferably programmed to display the Row Selection screen 1220 (FIG. 10) through which the operator can select a Level 3 Screen (discussed later) for that particular row.

SnapShot Button 1034

Upon pressing the Snapshot button 1034, the monitor 1000 is preferably programmed to store all data inputs from the various sensors on a read/writable storage medium for a predefined time period, preferably ninety seconds, across all row units. The read/writable storage medium may be a magnetic data storage tape or disk, or a solid state semi-conductor memory storage device such as flash memory or a memory card, or the read/writable storage medium may be any type of remote computer or storage device to which data can be communicated by via a wired or wireless connection. The purpose of the SnapShot button 1034 will be described in detail later.

Back Button 1036

The Back button 1036 changes the screen to the previously displayed screen.

Level 2 Screens (FIGS. 6-8)

Population Details Screen (FIG. 6)

FIG. 6 is an example of a preferred embodiment for displaying population details in a bar graph format for all rows of a planter. In the example of FIG. 6, a bar graph 1200 of the population details for a 32 row planter is shown. The number of rows displayed for the bar graph 1200 may be dynamic based on the number of rows entered during Setup. Alternatively, the number of rows may remain fixed on the screen with data only being displayed for the number of rows entered during Setup.

The horizontal line 1202 on the bar graph 1200 corresponds to the population target 1338 (FIG. 11) entered during Setup and the vertical scale of the bar graph 1200 preferably corresponds to the deviation limit 1342 (e.g., ±1000 seeds) specified during Setup. The numeric population value 1112 for each row is graphically displayed as a data bar 1204 above or below the horizontal line 1202 depending on whether the numeric population value is greater than or less then the target population value 1338, respectively. In the preferred embodiment, if a particular row approaches or exceeds the deviation limit 1342, an alarm condition is triggered and the data bar 1204 for that row preferably includes a visual indication that it is in alarm condition. For example, in the preferred embodiment, the data bar 1204 for a row in an alarm condition is colored yellow (solid bars) whereas the data bars 1204 of the rows that are not in an alarm condition are green (clear bars). Alternatively, the data bars 1204 may flash under an alarm condition or change to a different color, such as red, under specific alarm conditions or depending on the severity of the yield robbing event. As with the different Level 1 Screens, there are various ways to represent an alarm condition, by different colors, audible alarms, etc. Accordingly, any and all means of visually or audibly indicating an alarm condition should be considered within the scope of this invention.

In the preferred embodiment, the touch screen GUI 1004 preferably enables the operator to touch a bar 1204 for a particular row to change the screen to the Level 3 Screen display for that selected row. The up arrow button 1206 and down arrow button 1206 preferably enables the operator to scroll between the various Level 2 Screens (FIGS. 6-8) as hereinafter described. The Back button 1036 changes to the previously displayed screen. The Home button 1209 returns to the Level 1 Screen (FIG. 5). The Row Details button 1032 preferably displays the Row Selection screen (FIG. 10).

Singulation Details Screen (FIG. 7)

FIG. 7 is an example of a preferred embodiment for displaying singulation details in a bar graph format for all rows of a planter. In the example of FIG. 7, a bar graph 1210 of the singulation details for a 32 row planter is shown. The number of rows displayed for the bar graph 1210 may be dynamic based on the number of rows entered during Setup. Alternatively, the number of rows may remain fixed on the screen with data only being displayed for the number of rows entered during Setup.

The horizontal line 1212 on the bar graph 1210 corresponds to 100% singulation (i.e., zero multiples and zero skips) and the vertical scale of the bar graph 1210 preferably corresponds to the singulation deviation limit 1350 (e.g., 1% in FIG. 11) specified during Setup. The % Mults 1126 for a particular row are displayed as a data bar 1184 above the horizontal reference line 1212. The % Skips 1124 for a particular row are displayed as a data bar 1214 below the horizontal reference line 1212. In the preferred embodiment, if a particular row approaches or exceeds the singulation deviation limit 1350, an alarm condition is triggered and the data bar 1214 for that row preferably includes a visual indication that it is in alarm condition. For example, in the preferred embodiment, the data bar 1214 for a row in an alarm condition is colored yellow (solid bars) whereas the data bars 1214 of the rows that are not in an alarm condition are green (clear bars). Alternatively, the data bars 1214 may flash under an alarm condition or change to a different color, such as red, under specific alarm conditions or depending on the severity of the yield robbing event. As with the different Level 1 Screens, there are various ways to represent an alarm condition, by different colors, audible alarms, etc. Accordingly, any and all means of visually or audibly indicating an alarm condition should be considered within the scope of this invention.

In the preferred embodiment, the touch screen GUI 1004 preferably enables the operator to touch a bar 1214 for a particular row to change the screen to the Level 3 Screen display for that selected row. All other buttons identified on FIG. 7 perform the same functions as described for FIG. 6.

Placement Details Screen (FIG. 8)

FIG. 8 is an example of a preferred embodiment for displaying placement details in a bar graph format for all rows of a planter. In the example of FIG. 8, a bar graph 1216 of the singulation details for a 32 row planter is shown. The number of rows displayed for the bar graph 1216 may be dynamic based on the number of rows entered during Setup. Alternatively, the number of rows may remain fixed on the screen with data only being displayed for the number of rows entered during Setup.

The horizontal line 1220 on the bar graph 1216 corresponds to 100% good spacing (i.e., zero misplaced seeds) and the vertical scale of the bar graph 1216 preferably corresponds to a placement deviation limit (e.g., 10%) that may be specified during Setup. The numeric percent good spacing value 1144 for each row is graphically displayed as a data bar 1218 above a horizontal line 1220. In the preferred embodiment, if a particular row approaches or exceeds the placement deviation limit, an alarm condition is triggered and the data bar 1218 for that row preferably includes a visual indication that it is in alarm condition. For example, in the preferred embodiment, the data bar 1218 for a row in an alarm condition is colored yellow (solid bars) whereas the data bars 1218 of the rows that are not in an alarm condition are green (clear bars). Alternatively, the data bars 1218 may flash under an alarm condition or change to a different color, such as red, under specific alarm conditions or depending on the severity of the yield robbing event. As with the Level 1 Screens, there are various ways to represent an alarm condition, by different colors, audible alarms, etc. Accordingly, any and all means of visually or audibly indicating an alarm condition should be considered within the scope of this invention.

In the preferred embodiment, the touch screen GUI 1004 preferably enables the operator to touch a data bar 1218 for a particular row to change the screen to the Level 3 Screen display for that selected row. All other buttons identified on FIG. 8 perform the same functions as described for FIG. 6.

Level 3 Screens (FIGS. 9-12)

Row Details (FIG. 9)

FIG. 9 is an example of a preferred embodiment for displaying Row Details. In the example of FIG. 9, the row details for row "16" of the planter are illustrated. Preferably, the information displayed in this Level 3 Screen is similar to that displayed in the Level 1 Screen, except that in the Level 3 Screen, the information is row specific as opposed to averaged across all rows in the Level 1 Screens. Thus, the Level 3 Row Detail Screen preferably includes a Row Population window 1220, a Row Singulation window 1222, a Row Skips/Multiples window 1224, a Row Down Force Window 1226, a Row Vacuum Window 1228 (when applicable) and a Row Economic Loss window 1230. The Level 3 Row Detail Screen also preferably includes a Row Good Spacing window 1232 and, preferably, a graphical Row Seed Placement window 1234. The Home button 1209, Row Details button 1032, Up Arrow button 1206, Down Arrow button 1208, and Back button 1036 perform the same functions as described for FIG. 6.

Population Window 1220

The Population window 1220 preferably displays the row population value 1240 calculated as identified under the Level 1 Screen except that the row population value 1240 is specific to the selected row and is not averaged as in the Level 1 Screen.

Singulation Window 1302

The Singulation window 1302 preferably displays the row percent singulation value 1242 calculated as identified under the Level 1 Screen except the row percent singulation value 1242 is specific to the selected row and is not averaged as in the Level 1 Screen.

Row Skips/Multiples Window 1224

The Row Skips/Multiples window 1224 preferably displays the row % Skips value 1244 and the row % Mults value 1246 calculated as identified under the Level 1 Screen except these values are specific to the selected row and are not averaged as in the Level 1 Screen.

Row Down Force Window 1226

The Row Downforce window 1226 is preferably only displayed on rows equipped with the load sensor 300. When the row of interest is not equipped with a load sensor, the Row Downforce window is preferably blank. When the row of interest is equipped with a load sensor 300, the Row Downforce window 1226 preferably cycles between the display of the downforce value 1248 (lbs), and/or the load margin, and/or the ground contact parameter 1250. As disclosed in PCT/US2008/50427 the downforce may be the load value (i.e., total load) detected during a predefined sampling period (e.g., 1 second time periods). The load margin is preferably the value calculated and/or derived as disclosed in PCT/US2008/50427. Likewise, the ground contact parameter 1250 is preferably determined by the methods disclosed in PCT/US2008/50427.

Row Vacuum Window 1228

The Row Vacuum Window 1228 is preferably only displayed on rows equipped with a vacuum sensor 700. When the row of interest is not equipped with a vacuum sensor, the Row Vacuum window is preferably blank. When the row of interest is equipped with a vacuum sensor, the Row Vacuum window 1228 preferably displays the vacuum 1252 (in inches H2O) for that row.

Row Economic Loss window 1230

The Row Economic Loss window 1230 preferably displays the row economic loss value 1232 calculated as identified under the Level 1 Screen except the row percent singulation value 1254 is specific to the selected row and is not totaled across all rows as in the Level 1 Screen.

Row Good Spacing Window 1230

The Row Good Spacing window 1230 preferably displays the row good spacing percentage value 1256 calculated as identified under the Level 1 Screen except the row good spacing percentage value 1256 is specific to the selected row and is not averaged as in the Level 1 Screen.

Row Seed Placement Window 1234

The Row Seed Placement window 1234 preferably graphically displays a representation of each classified seed detected in that row (i.e., good, skip, multiple, misplaced2, misplaced4) over a distance behind the planter scrolling from the right hand side of the window to the left hand side of the window. In the preferred embodiment, good seeds are represented as green plants 1258, skips are represented by a red circle-X 1260, doubles and misplaced2 seeds are represented as red plants 1262 and misplaced4 seeds are represented as yellow plants 1264. Of course, it should be appreciated that any other graphical representation of the seeds may be equally suitable and therefore any and all graphical representation of seed placement should be considered within the scope of the present invention. The Row Placement window 1234 preferably includes a distance scale 1266 representative of the distance behind the planter that the seeds/plants are displayed. Preferably the Row Placement window 1234 includes a "reverse" or rewind button 1268, a "fast forward" button 1270, and a play/pause button 1272. The reverse button 1268 preferably causes the distance scale 1266 to incrementally increase in distance behind the planter (such as 25 feet) and scrolls the plants to the right (as opposed to the left) to permit the operator to review the seed placement further behind the planter. Alternatively, rather than scrolling the graphical representation of the seeds/plants, the reverse button may cause the scale to "zoom out," for example the scale may increase at five foot increments to a scale of 0 to 25 feet instead of 0 to 10 feet. Similarly, the fast forward button 1270 permits the user to either scroll to the right up to zero feet behind the planter or to "zoom in" the distance scale. The play/pause button 1272 preferably permits the operator to pause or freeze the screen to stop the plants/seeds from scrolling and, upon pushing the button 1272 again, to resume the scrolling of the seeds.

Row Selection (FIG. 10)

A preferred embodiment of the Row Selection Screen 1274 is illustrated in FIG. 10 in which a plurality of buttons 1276 are displayed corresponding to the row number of the planter. By touching a button 1276 corresponding to the row of interest, the preferred touch screen GUI 1004 displays the Level 3 Row Details Screen (FIG. 9) for the selected planter row. The number of buttons 1276 displayed may vary depending on the size of the planter entered during Setup. Alternatively, the Row Selection Screen 1274 may have a fixed number of buttons 1276 corresponding to the largest planter available, but if the operator specifies a smaller number of rows during Setup, only the rows corresponding to the planter size entered would provide the foregoing functionality. All other buttons identified on FIG. 10 perform the same functions as described for FIG. 6. The Row Details button 1032 is preferably not displayed in this screen.

Setup Screen (FIG. 11)

The preferred embodiment of a Setup Screen 1300 is illustrated in FIG. 11. The Setup Screen 1300 preferably includes a plurality of predefined windows, each of which preferably displays relevant configuration information and opens a Level 4 Screen for entering that configuring information. The preferred windows include a Field window 1302, a Crop window 1304, a Population window 1306, a Population Limits window 1308, a Meter window 1310, a Planter window 1312, a Singulation Limits window 1314, an Averaged Seeds window 1316, an Ear Loss window 1318 and a File & Data Transfer window 1320. The other buttons identified on FIG. 11 perform the same functions as described for FIG. 6. The Row Details button 1032 is preferably not displayed in this screen.

Field Window 1302

The Field window 1302 preferably opens a Level 4 Alpha-Numeric Keyboard Screen similar to the alpha-numeric keypad 1322 illustrated in FIG. 12 by which the operator can type alpha-numeric characters for entering a field identifier 1324. Preferably, upon pressing the "Enter" button 1326, the operator is returned to the Setup Screen 1300 and the field identifier 1324 is caused to be displayed in the Field window 1302.

Crop Window 1304

The Crop window 1304 preferably opens a Level 4 Crop Selection Screen 1328, a preferred embodiment of which is illustrated in FIG. 12. The Crop Selection Screen 1328 preferably includes a plurality of predefined crop-type buttons 1330 each having a crop type designator 1332 corresponding to the name of the most typical crops planted by row crop planters, namely, corn, beans, and cotton. Upon selecting one of these buttons, the operator is preferably returned to the Setup Screen 1300 and the corresponding crop-type designator 1332 is displayed in the Crop window 1304. The Crop Selection Screen 1328 also preferably includes a button labeled "Other" 1334, which upon selection, permits the operator to manually type in the name of the crop-type designator 1332 (e.g., sorghum or some other type of crop) into the window 1336 through the alpha-numeric keypad 1322. Upon pressing the "Enter" button 1326, the operator is returned to the Setup Screen 1300 and the crop designator 1322 manually typed in is displayed in the Crop window 1304. The other buttons identified on FIG. 11 perform the same functions as described for FIG. 6.

Population Window 1306

The Population window 1306 preferably displays the target seed population 1338. The target seed population 1338 may be a uniform target population, a variable population, or an exception population, and is preferably set through a Level 4 Population Settings Screen 1340, a preferred embodiment of which is illustrated in FIG. 13 (discussed later). The Population Settings Screen 1340 preferably opens upon selection of the Population window 1306 through the preferred touch screen GUI 1004.

Population Limits Window 1308

The Population Limits window 1308 preferably opens the Level 4 Alpha-Numeric Keyboard Screen (FIG. 12) as previously discussed by which the operator can type in the desired the population deviation limit 1342 if the operator does not wish to use the default limit of 1000 seeds. Preferably, upon pressing the "Enter" button 1326, the operator is returned to the Setup Screen 1300 and the population deviation limit 1342 is caused to be displayed in the Population Limits window 1308. The population deviation limit 1342 is the number of seeds by which the actual seed count may vary before setting off an alarm condition, and it is the value used in the scale of the bar graph 1200 in the Level 2 Population Details Screen of FIG. 6.

Meter Window 1310

The Meter window 1310 preferably opens a Level 4 Meter Selection Screen (not shown) through which the operator can select from among a plurality of predefined keys corresponding to the meter type 1344 of the metering device 30 used by the planter. The meter types preferably include finger meters and vacuum meters. Upon selection of the meter type 1344, the operator is preferably returned to the Setup Screen 1300 and the meter type 1344 is preferably displayed in the Meter Window 1310.

Planter Window 1312

The Planter window 1312 preferably opens the Level 4 Alpha-Numeric Keyboard Screen (FIG. 12) as previously discussed through which the operator can type in the number of rows 1346 on the planter and the row spacing 1348 of the planter. Preferably, upon pressing the "Enter" button 1326, the operator is returned to the Setup Screen 1300 and the planter rows 1346 and row spacing 1348 are caused to be displayed in the Planter window 1312.

Singulation Limits Window 1314

The Singulation Limits window 1314 preferably opens the Level 4 Alpha-Numeric Keyboard Screen (FIG. 12) as previously discussed through which the operator can type in the desired singulation deviation limit 1350 if the operator does not wish to use the default 1% singulation deviation limit. Preferably, upon pressing the "Enter" button 1326, the operator is returned to the Setup Screen 1300 and the singulation deviation limits 1350 is caused to be displayed in the Singulation Limits window 1314. The singulation deviation limit 1342 is the percentage by which the singulation may vary before setting off an alarm condition, and it is the percentage used in the scale of the bar graph 1210 in the Level 2 Singulation Details Screen of FIG. 7.

Averaged Seeds Window 1316

The Averaged Seeds window 1316 preferably opens the Level 4 Alpha-Numeric Keyboard Screen (FIG. 12) as previously discussed through which the operator can type in the desired averaged seeds value 1352 if the operator does not wish to use the default averaged seeds value of 300. Preferably, upon pressing the "Enter" button 1326, the operator is returned to the Setup Screen 1300 and the averaged seeds value 1352 is caused to be displayed in the Singulation Limits window 1314.

Ear Loss window 1318

The Ear Loss window 1318 preferably opens the Level 4 Screen (FIG. 12) as previously discussed through which the operator can type in the desired loss values 1354 if the operator does not wish to use the default values previously discussed. Preferably, upon pressing the "Enter" button 1326, the operator is returned to the Setup Screen 1300 and the ear loss values 1354 entered by the operator are caused to be displayed in the Ear Loss window 1318. As previously discussed, the ear loss values 1354 are used in calculating the row economic loss value 1254 displayed in the Row Economic Loss window 1230 (FIG. 9) and the overall economic loss value 1176 displayed in the Economic Loss window 1028 (FIG. 5).

Level 4 Screen (FIG. 13)

Population Settings Screen (FIG. 13)

The Population Settings Screen 1340 preferably includes a simple population window 1370, preferably at least two variable population windows 1372, 1374 and an Exception Population window 1376. Each of the various population windows preferably includes a data window 1378 into which the population value 1338 may be entered for the particular population type selected. For example, if the operator intends to plant a field with a uniform population, the operator would select the simple population window 1370 and type in the desired population using the numeric keys in 1380 in the keypad window 1382. Alternatively, if the operator wishes to vary the population over the field based on field mapping data, for example, the operator can select the first variable population window 1372 and enter the first variable population 1338 using the keys 1380 as before. The operator can then select the second variable population window 1374 and enter the second variable population value 1338 using the keys 1380. If the operator wishes to plant different rows at different populations, for example when planting seed corn, the operator can select the exception population window 1376 and enter the seed population value 1338 for the exception rows using the keys 1380. In the preferred embodiment, the operator can then preferably select the exception rows by touching the corresponding planter row indicator 1384 in the exception row window 1386 to which the exception population will apply. In the example of FIG. 13, the operator has selected every fifth row of the planter to plant the exception population of 21000 seeds, whereas the non-highlighted rows will plant at the designated simple population of 31200 seeds.

In the preferred embodiment, if the first variable population window 1372 is selected, the simple population window 1370 and the exception population window 1376 preferably change to variable population windows, thus allowing the operator to set four variable populations.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A monitor system for an agricultural seed planter having a plurality of row units, each of the plurality of row units having a depth regulation member and a seed meter adapted to discharge seeds in a seed path as the planter moves through a field, the monitor system comprising:
   a seed sensor disposed with respect to the seed path to generate seed signals as the seeds pass;
   a vertical motion sensor capable of detecting vertical motion and generating signals in response to said detected vertical motion associated with at least one of the row units as the planter moves through the field;
   a visual display; and
   processing circuitry operably electrically coupled to said visual display, to said vertical motion sensor and to said seed sensor, said processing circuitry configured to monitor and display information pertaining to operation of the planter ("Seed Planting Information"), said processing circuitry responsive to said generated signals and further configured to monitor and display ride information based on said generated signals.

2. The monitor system of claim 1 further comprising:
   an accelerometer associated with at least one of the row units, wherein said accelerometer is disposed to detect vertical acceleration of the row unit as the planter traverses the field.

3. The monitor system of claim 2, wherein said processing circuitry is further configured to use said vertical acceleration to calculate a vertical velocity of the row unit as the planter traverses the field, and wherein said ride information is a function of said vertical velocity.

4. The monitor system of claim 1, further comprising:
   a load sensor associated with at least one of the row units and disposed to generate load signals corresponding to loads exerted on the row units, wherein said processing circuitry is operably electrically coupled to said load sensor.

5. The monitor system of claim 4, wherein said processing circuitry is further configured to monitor and display information pertaining to loads exerted on the depth regulation member ("Load Information").

6. The monitor system of claim 5 wherein said load sensor is associated with at least one of the depth regulation members and disposed to generate load signals corresponding to loads exerted on the depth regulation member.

7. The monitor system of claim 6 wherein said Load Information includes a load margin.

8. The monitor system of claim 7 wherein said load margin is a function of a minimum load on the depth regulating member during a sampling period.

9. The monitor system of claim 6 wherein said Load Information is a function of a minimum load on the depth regulating member during a sampling period.

10. The monitor system of claim 1, wherein said processing circuitry cooperates with said motion sensor to determine a motion parameter of the row unit.

11. The monitor system of claim 10 wherein said ride information is a function of said motion parameter.

12. The monitor system of claim 11 wherein said motion parameter is vertical velocity.

13. The monitor system of claim 10 wherein said ride information is related to a percentage of a sampling period during which said motion parameter is outside a predefined range.

14. The monitor system of claim 13 wherein said motion parameter is vertical velocity.

15. The monitor system of claim 1 wherein the row units of the planter are grouped and further wherein a vertical accelerometer is associated with each of said groups of row units and disposed to detect vertical acceleration of each of said groups as the planter traverses the field.

16. The monitor system of claim 15 wherein said processing circuitry is further configured to calculate and display a ride smoothness of each of said groups of row units.

17. The monitor system of claim 15 wherein said processing circuitry is further configured to calculate and display an average ride smoothness of said groups of row units.

18. The monitor system of claim 17 wherein said processing circuitry is further configured to display a graphical indication of which of said groups of row units experiences the lowest ride smoothness during a sample period.

19. The monitor system of claim 18 wherein said processing circuitry is further configured to display a graphical representation of the lowest ride smoothness of the group of row units together with said graphical indication of the average ride smoothness of said groups of row units.

20. The monitor system of claim 15 wherein said processing circuitry is further configured to display at least one of a ride smoothness of each of the group of row units and an average ride smoothness of said groups of row units.

21. The monitor system of claim 20, further comprising:
   a load sensor associated with at least one of the row units and disposed to generate load signals corresponding to loads exerted on the row units, wherein said processing circuitry is operably electrically coupled to said load sensor, and wherein said processing circuitry is further configured to monitor and display information pertaining to loads exerted on the depth regulation member ("Load Information"), wherein said Load Information includes a load margin.

22. The monitor system of claim 21 wherein said load margin is a function of an average load on the depth regulating member over a first sampling period and a standard deviation of the load on the depth regulating member over one of the first sampling period and a second sampling period.

23. The monitor system of claim 21 wherein said load margin is an estimation of an amount of force on the depth regulating member in excess of the amount needed to maintain desired furrow depth, wherein said estimation is based on the load on the depth regulating member over a sampling period.

24. The monitor system of claim 21 wherein said load margin is a function of a minimum load on the depth regulating member during a sampling period.

25. The monitor system of claim 21 wherein said Seed Planting Information includes skips and multiples detected during a sampling period.

26. The monitor system of claim 1 wherein said Load Information includes a load margin.

27. The monitor system of claim 26 wherein said load margin is a function of a minimum load on the depth regulating member during a sampling period.

28. The monitor system of claim 26 wherein said load margin is an estimation of an amount of force on the depth regulating member in excess of the amount needed to maintain desired furrow depth, wherein said estimation is based on the load on the depth regulating member over a sampling period.

* * * * *